(12) United States Patent (10) Patent No.: US 9,034,082 B2
Betting et al. (45) Date of Patent: May 19, 2015

(54) MULTISTAGE CYCLONIC FLUID SEPARATOR

(75) Inventors: Marco Betting, Rijswijk (NL); Cornelis Antonie Tjeenk Willink, Rijswijk (NL); Robert Petrus van Bakel, Rijswijk (NL)

(73) Assignee: Twister B.V. (NL)

( * ) Notice: Subject to any disclaimer, the term of this patent is extended or adjusted under 35 U.S.C. 154(b) by 748 days.

(21) Appl. No.: 13/148,027

(22) PCT Filed: Feb. 5, 2009

(86) PCT No.: PCT/NL2009/050052
§ 371 (c)(1),
(2), (4) Date: Oct. 21, 2011

(87) PCT Pub. No.: WO2010/090510
PCT Pub. Date: Aug. 12, 2010

(65) Prior Publication Data
US 2012/0024690 A1    Feb. 2, 2012

(51) Int. Cl.
*B01D 45/12*       (2006.01)
*F25J 3/02*        (2006.01)
(Continued)

(52) U.S. Cl.
CPC ............. *F25J 3/0233* (2013.01); *B01D 45/16* (2013.01); *B04C 3/00* (2013.01); *B04C 3/02* (2013.01); *B04C 3/06* (2013.01); *F25J 3/0209* (2013.01);
(Continued)

(58) Field of Classification Search
CPC ......... F25J 3/0233; F25J 3/064; F25J 3/0645; F25J 3/061; F25J 3/0242; F25J 3/0209; F25J 3/0635; F25J 2205/10; F25J 2200/78; F25J 2205/04; F25J 2200/00; B01D 45/16; B04C 3/06; B04C 3/00; B04C 3/02

USPC ............ 95/30, 261, 34, 29, 269, 31, 241, 42; 96/195, 389, 380, 381, 234, 239, 314; 55/457, 396, 447, 459.1, 468, DIG. 14, 55/416, 385.1, 338, 340; 210/787, 512.1; 261/76, 116

See application file for complete search history.

(56) References Cited

U.S. PATENT DOCUMENTS

| 5,890,378 A | 4/1999 | Rambo |
| 6,372,019 B1 | 4/2002 | Alferov |

(Continued)

FOREIGN PATENT DOCUMENTS

| EP | 0210910 | 2/1987 |
| FR | 2558741 | 8/1985 |

(Continued)

*Primary Examiner* — Dung H Bui
(74) *Attorney, Agent, or Firm* — Tucker Ellis LLP

(57) ABSTRACT

The invention relates to a cyclonic fluid separator comprising a throat portion (4) which is arranged between a converging fluid inlet section and a diverging fluid outlet section. The cyclonic fluid separator is arranged to facilitate a cyclonic flow through the converging fluid inlet section and the throat portion towards the diverging fluid outlet section in a downstream direction. The diverging fluid outlet section comprises an inner primary outlet conduit (7) for condensable depleted fluid components and an outer secondary outlet conduit (6) for condensable enriched fluid components. The cyclonic fluid separator comprises a further outer secondary outlet conduit (16). The outer secondary outlet conduit (6) is positioned on a first position along a central axis (I) of the cyclonic fluid separator and the further outer secondary outlet conduit (16) is positioned on a second position along the central axis (I) of the cyclonic fluid separator.

4 Claims, 12 Drawing Sheets

Figure 1:
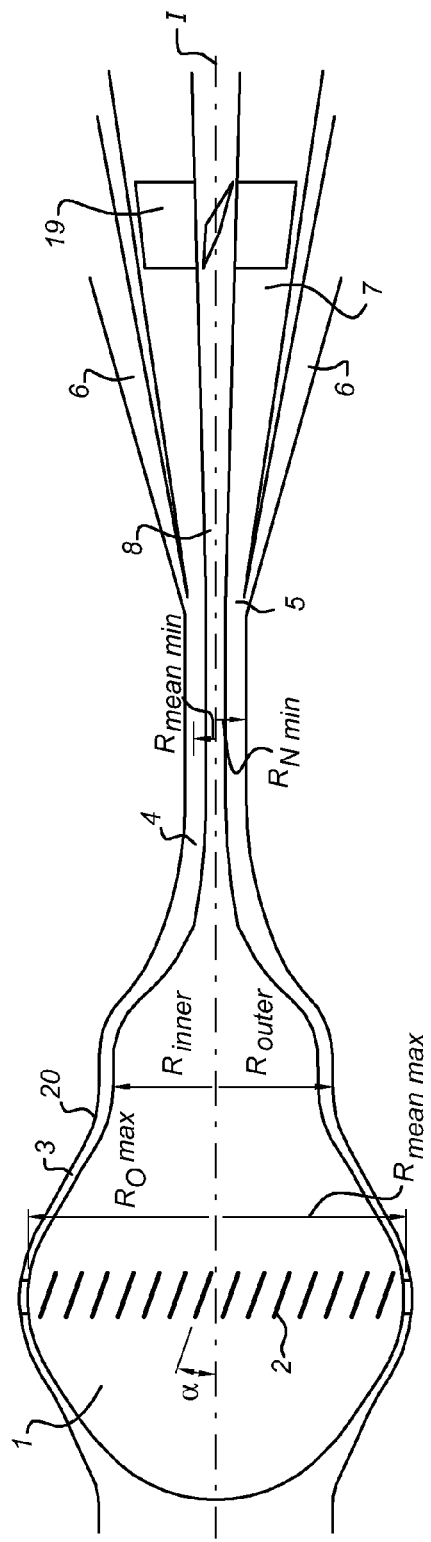

(51) Int. Cl.
  B01D 45/16 (2006.01)
  B04C 3/00 (2006.01)
  B04C 3/02 (2006.01)
  B04C 3/06 (2006.01)
  F25J 3/06 (2006.01)

(52) U.S. Cl.
  CPC ............... *F25J 3/0242* (2013.01); *F25J 3/061* (2013.01); *F25J 3/0635* (2013.01); *F25J 3/064* (2013.01); *F25J 3/0645* (2013.01); *F25J 2200/02* (2013.01); *F25J 2200/78* (2013.01); *F25J 2205/04* (2013.01); *F25J 2205/10* (2013.01); *F25J 2270/02* (2013.01)

(56) References Cited

U.S. PATENT DOCUMENTS

2007/0227186 A1   10/2007   Alferov
2009/0031756 A1*  2/2009    Betting et al. .................. 62/620
2009/0205488 A1*  8/2009    Betting et al. .................. 95/30

FOREIGN PATENT DOCUMENTS

GB    1146262      3/1969
WO    2006089948   8/2006
WO    2008000753   1/2008
WO    2008118018   10/2008

* cited by examiner

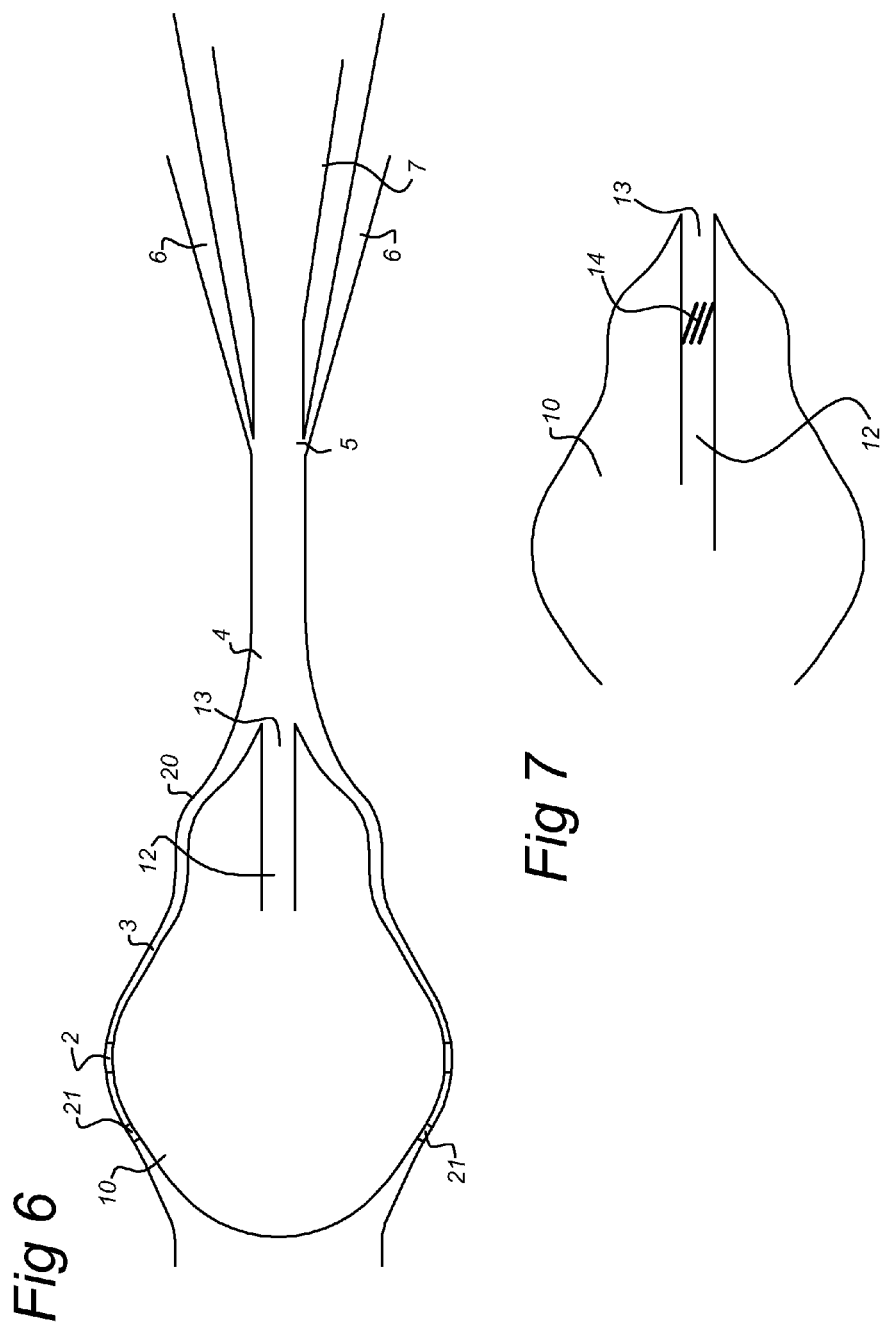

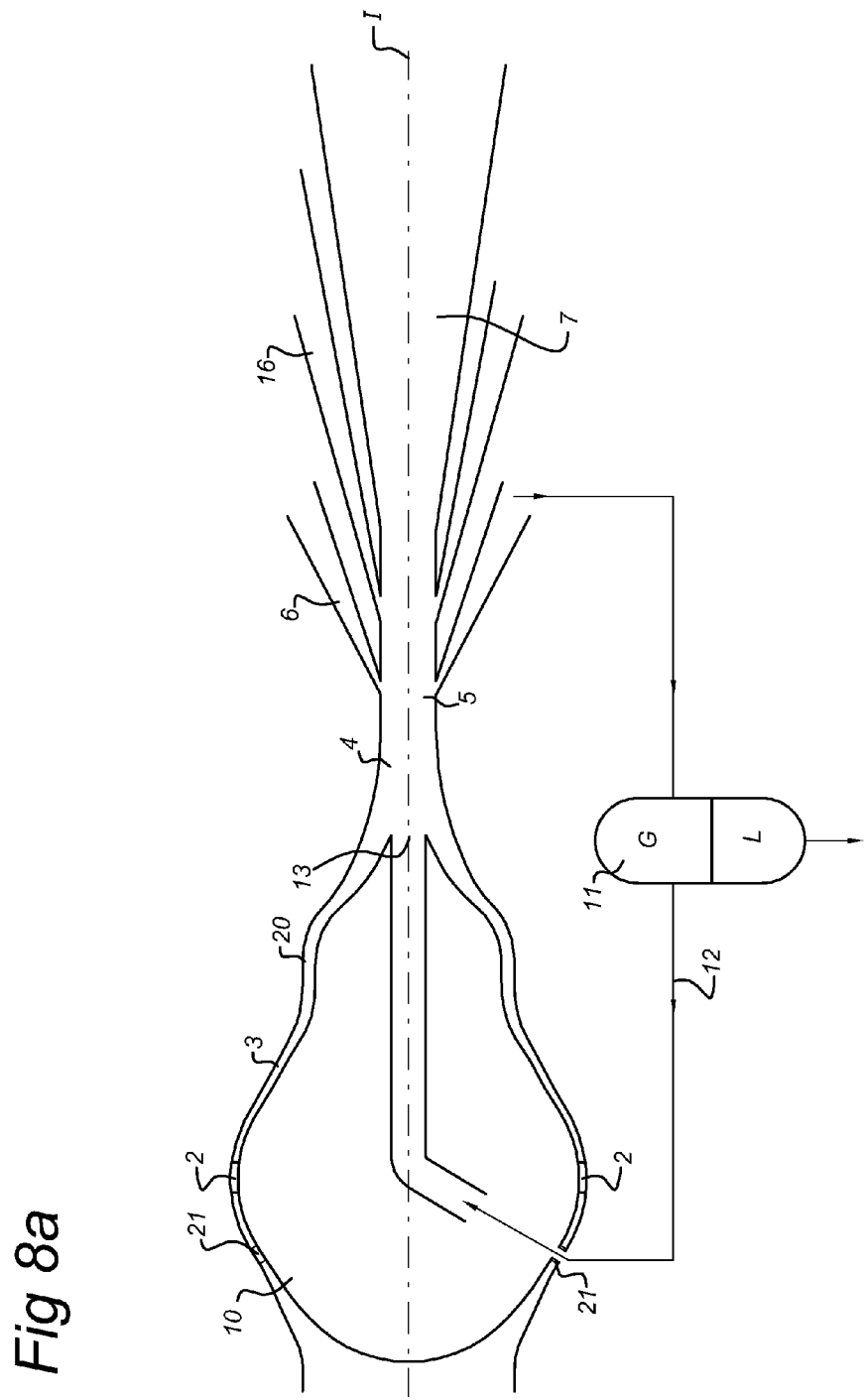

MULTISTAGE CYCLONIC FLUID SEPARATOR

TECHNICAL FIELD

The invention relates to a multistage cyclonic fluid separator, a system for separating liquids, a method of separating liquids from a compressible fluid flow.

STATE OF THE ART

The use of cyclonic fluid separators for the extraction of natural gas liquids (NGL) from natural gas is "common practice" in the oil and gas industry. NGL's are extracted to generate additional value or because of certain specifications that should be met.

WO03/029739A2 describes a cyclonic separator comprising a tubular throat portion in which the fluid stream is accelerated to a possibly supersonic speed and rapidly cooled down as a result of adiabatic expansion. The rapid cooling will cause condensation and/or solidification of condensable vapours in the fluid stream into small droplets or particles. If the fluid stream is a natural gas stream emerging from a natural gas production well then the condensable vapours may comprise water, hydrocarbons, carbon dioxide, hydrogen sulphide and mercury. These separators furthermore comprise an assembly of swirl imparting vanes in an inlet portion upstream of the throat portion, which vane or vanes are tilted or form a helix relative to a central axis of the throat portion to create a swirling motion of the fluid stream within the separator. The centrifugal forces exerted by the swirling motion on the fluid mixture will induce the relatively high density condensed and/or solidified components to swirl to the outer periphery of the interior of the throat portion and of a diverging outlet section whereas relatively low density gaseous components are concentrated near the central axis of the separator.

The gaseous components are subsequently discharged from the separator through a primary central outlet conduit, whereas the condensates enriched fluid stream is discharged from the separator through a secondary outlet which is located at the outer circumference of the diverging outlet section. A more detailed description of a cyclonic separator is described below with reference to FIG. 1.

A supersonic cyclonic fluid separator as described in more detail below with reference to FIG. 1 comprises a diverging fluid separation chamber 5 (flow splitter) to skim off the condensables enriched fluid components from condensables depleted fluid components. The composition of the separated liquid mixture is determined by the local equilibrium condition between the gas phase and the liquid phase at specified temperature (T) and pressure (P) in the cyclonic fluid separator at the position of the outer secondary outlet conduit 6. The advantage of this flow splitting device is that it imposes a minimum disturbance on the flow, allowing maximal static pressure recovery of both flows.

However the cyclonic fluid separator as described with reference to FIG. 1 has some disadvantages, such as:
 the liquid hold-up in the high speed section (between throat portion 4 and fluid separation chamber 5) is relatively high because the first droplets will deposit already in or before the throat portion 4 and have to be transported to the fluid separation chamber 5. Along this path liquid hold-up increases and induces dissipative interaction between the gas phase and liquid phase, thus limiting the maximum allowable liquid load inside the cyclonic fluid separator. This is particularly the case for heavier gases such as associated gases;
 liquids with relatively high boiling components will mostly form near the throat portion 4 where liquids with relatively low boiling components will mostly form near the fluid separation chamber 5; as a result the high boiling components will commingle with the low boiling components;
 in the cyclonic fluid separator hydrates may form, which may stick to the wall thereby reducing the efficiency of the cyclonic fluid separator;
 the incoming gas stream may also comprise fluid and solid particles, which may negatively influence the performance of the cyclonic fluid separator
 the level of expansion of the flow is limited once liquids are formed, thereby limiting the total amount of liquids that can be formed.

WO00/23757 describes an apparatus for the separation of the components of gas mixtures by liquefaction, using a cyclonic fluid separator. According to WO00/23757, the apparatus comprises more than one secondary outlet situated at different positions along the central axis of the cyclonic fluid separator after the throat. The positions of the secondary outlets are chosen taking into account the computed dew point of the different components, the speed of the gas flow and the time for the drops of the particular component to travel to the wall. By doing this, different condensed gaseous components are separated at different secondary outlets. WO00/23757 describes fractionating pure hydrocarbon components from a mixture of hydrocarbons at the different secondary outlets situated at different positions along the central axis of the cyclonic fluid separator after the throat. However the purity of these separated hydrocarbon fractions will not be optimal.

SHORT DESCRIPTION

It is an object to provide a cyclonic fluid separator and method that overcomes at least one of the above described disadvantages.

According to an aspect there is provided a cyclonic fluid separator comprising a throat portion which is arranged between a converging fluid inlet section and a diverging fluid outlet section,
 the cyclonic fluid separator being arranged to facilitate a cyclonic flow through the converging fluid inlet section and the throat portion towards the diverging fluid outlet section in a downstream direction,
 the diverging fluid outlet section comprising an inner primary outlet conduit for condensables depleted fluid components and an outer secondary outlet conduit for condensables enriched fluid components, wherein the cyclonic fluid separator comprises a further outer secondary outlet conduit, the outer secondary outlet conduit positioned on a first position along a central axis of the cyclonic fluid separator and the further outer secondary outlet conduit positioned on a second position along the central axis of the cyclonic fluid separator.

According to a further aspect there is provided a system for separating liquids from an inlet feed comprising a compressible fluid flow, the system comprising a cyclonic fluid separator as described above and a fractionation column, where
 the outer secondary outlet positioned on the first position is connected to a first level within the fractionation column and the further outer secondary outlet positioned on the second position is connected to a second level within the fractionation column, the first position being upstream with respect to the second position and the first level being lower than the second level.

According to a further aspect there is provided a method of separating liquids from a compressible fluid flow, the method comprises:

providing a cyclonic fluid flow to a cyclonic fluid separator comprising a converging fluid inlet section, a throat portion and a diverging fluid outlet section respectively, obtaining a first flow from an outer secondary outlet at a first position along a central axis of the cyclonic fluid separator, and obtaining a third flow from an inner primary outlet conduit, and obtaining a second flow from a further outer secondary outlet at a second position along a central axis of the cyclonic fluid separator.

According to a further aspect there is provided a method for separating liquids from an inlet feed being a compressible fluid flow, the system comprising a cooling system, a cyclonic fluid separator according to the above and a separation column, wherein the cooling system is arranged to receive the inlet feed and output a pre-cooled feed towards the cyclonic fluid separator, the cyclonic fluid separator is arranged to receive the pre-cooled feed and produce a condensables enriched first output feed and a condensables enriched second output feed towards the separation column, the separation column is arranged to produce a top feed of the separation column, wherein the system is arranged to guide at least part of the top feed of the separation column to the cooling system to cool the inlet feed.

SHORT DESCRIPTION OF THE DRAWINGS

Figure 2A:
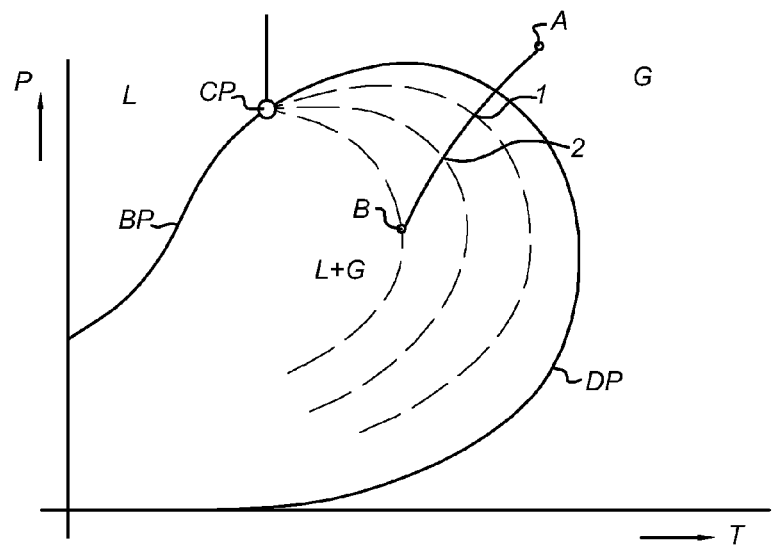
Figure 2B:
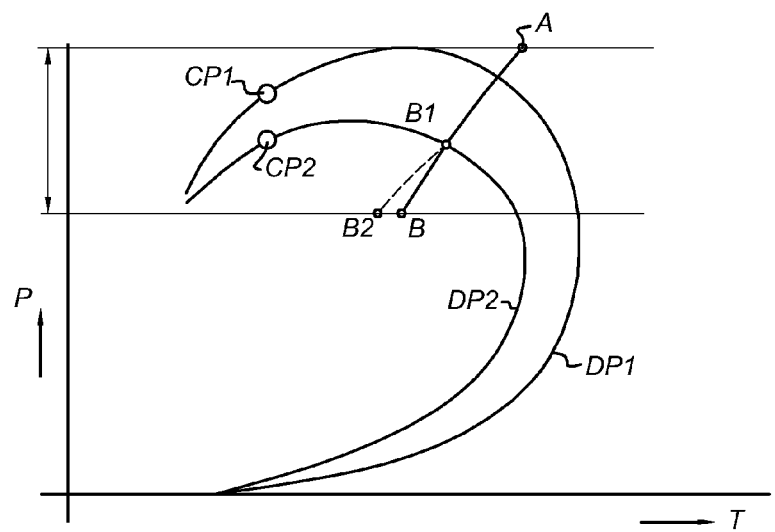
Figure 3:
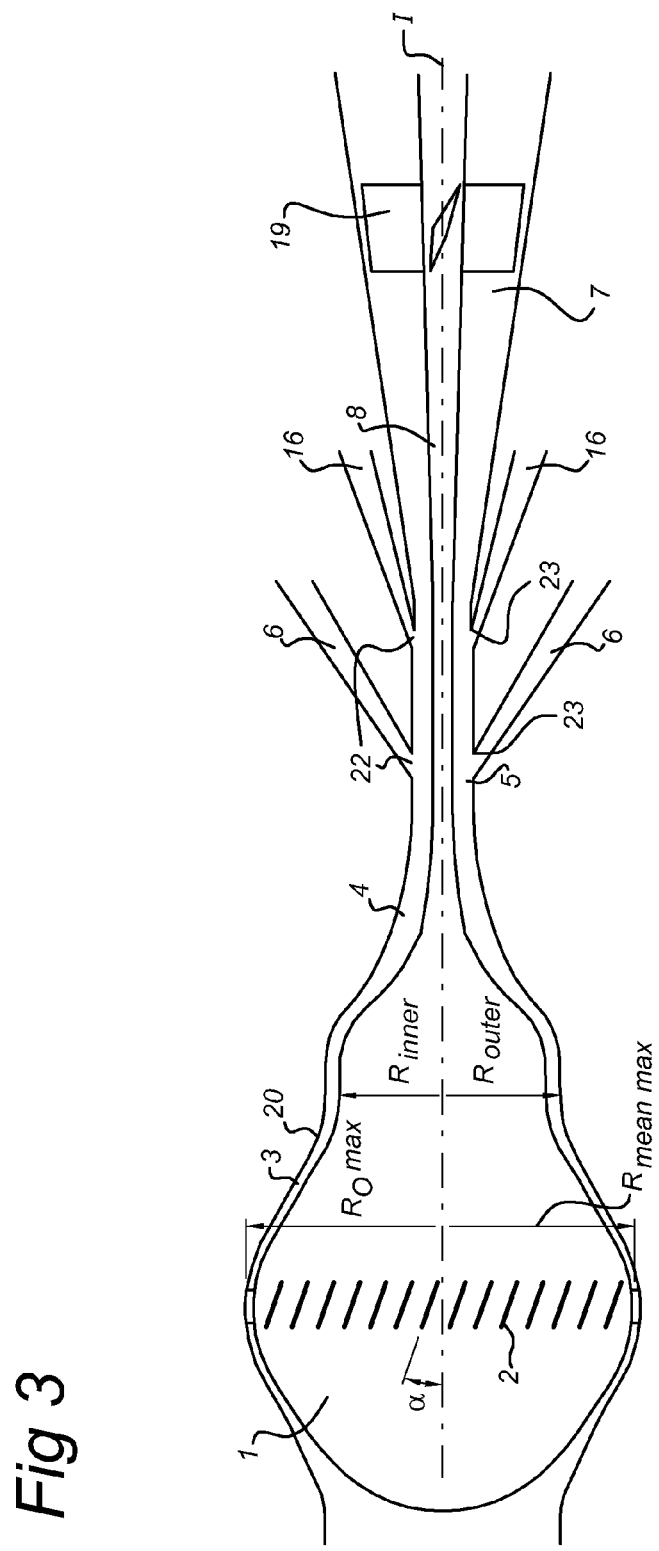
Figure 4:
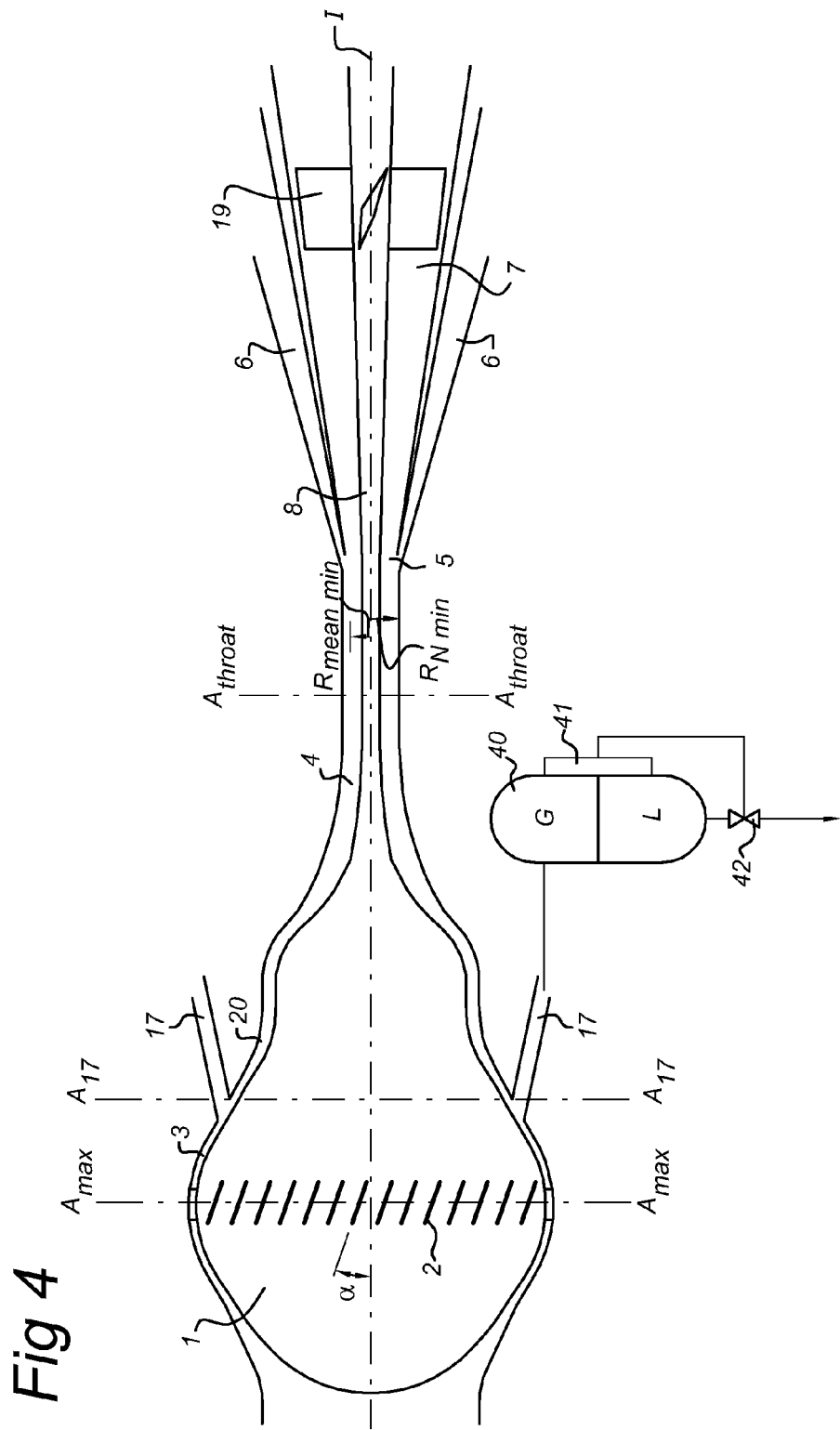
Figure 5:
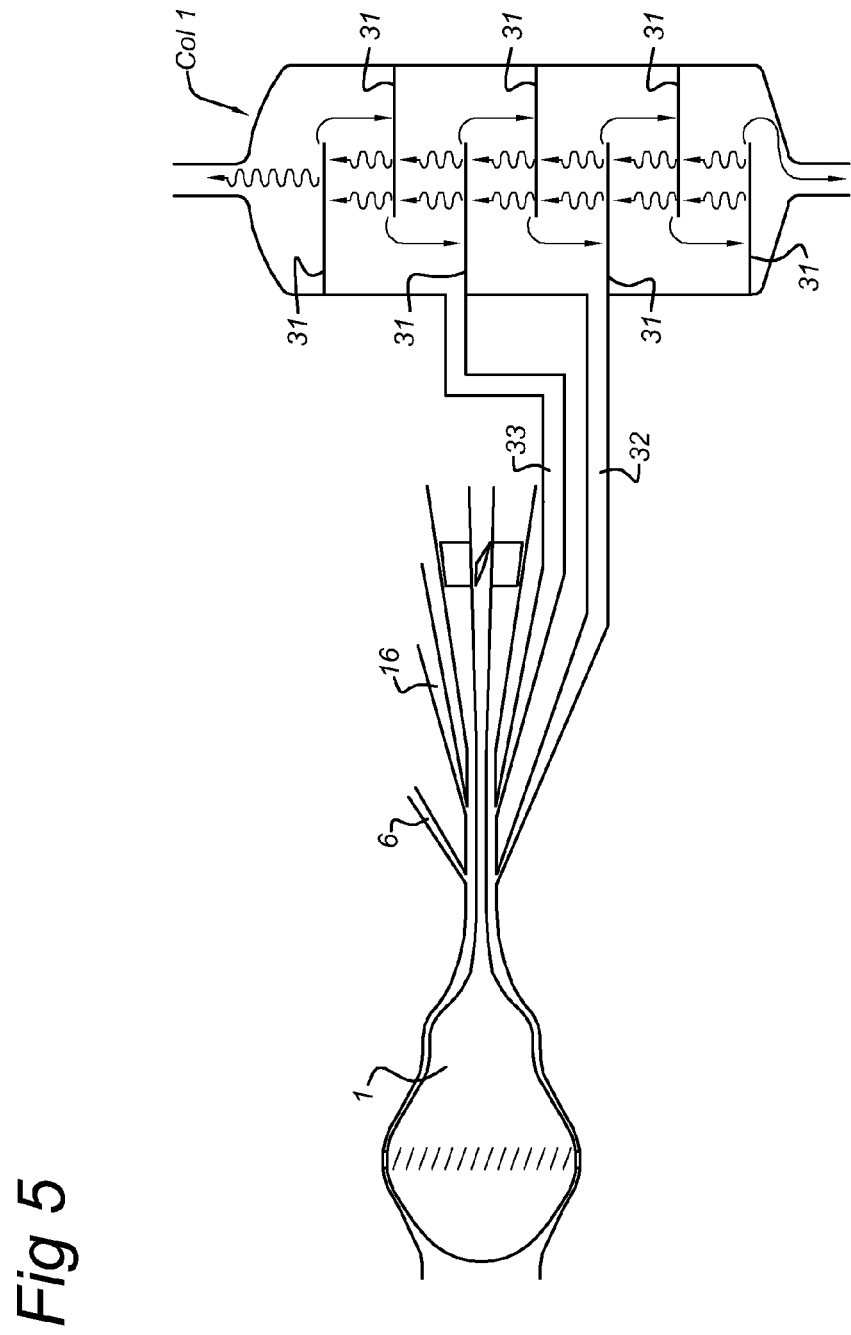
Figure 8B:
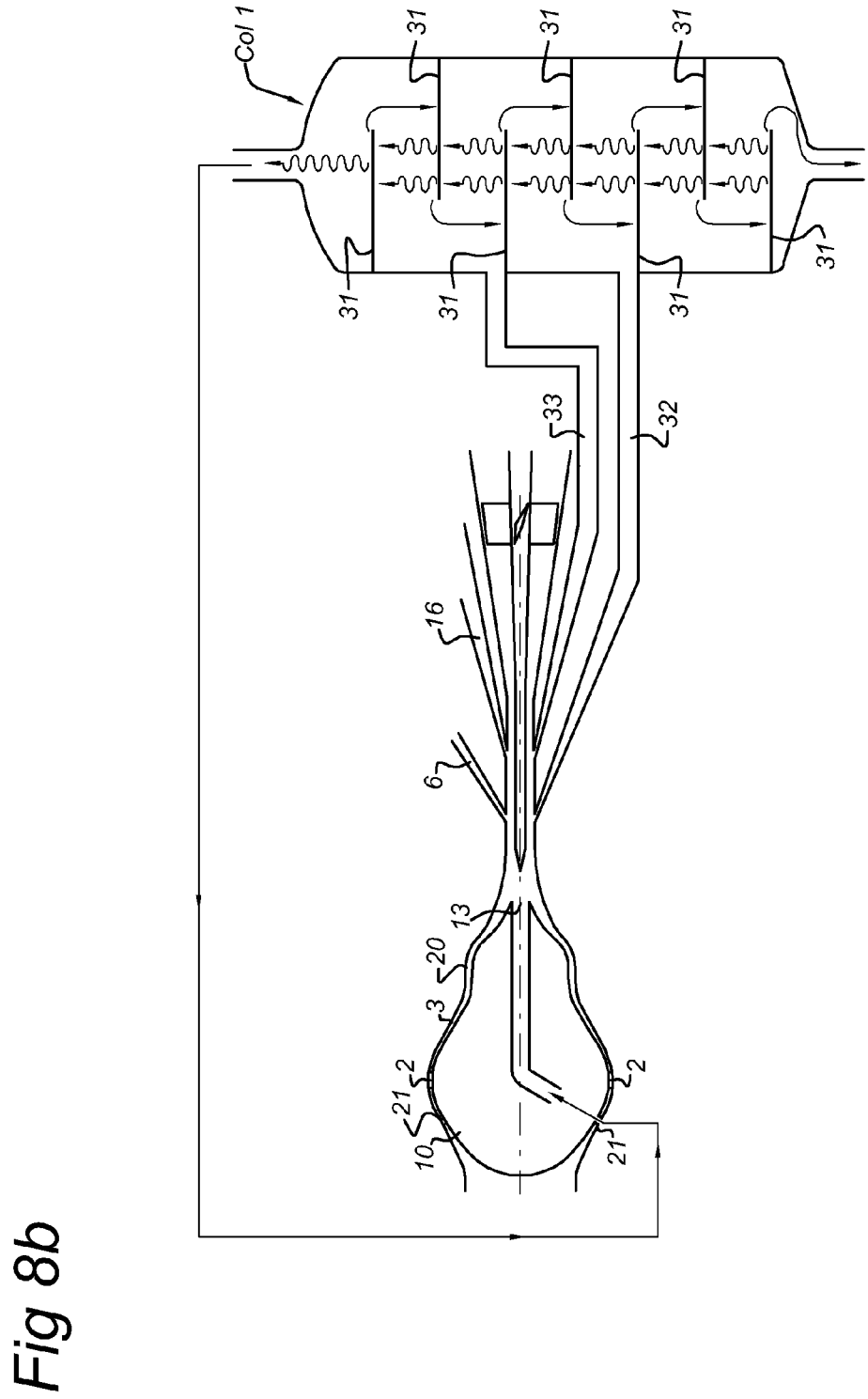
Figure 9:
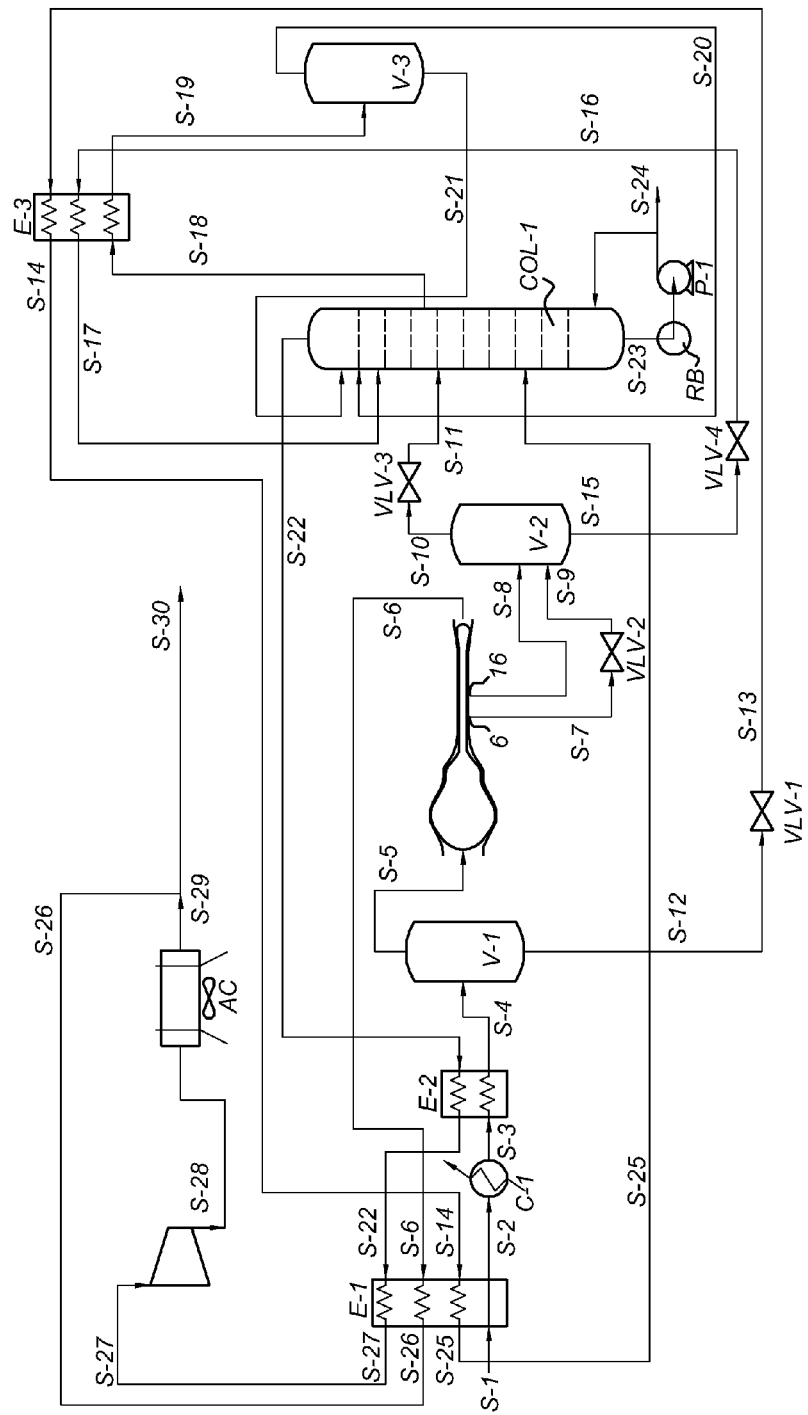
Figure 10:
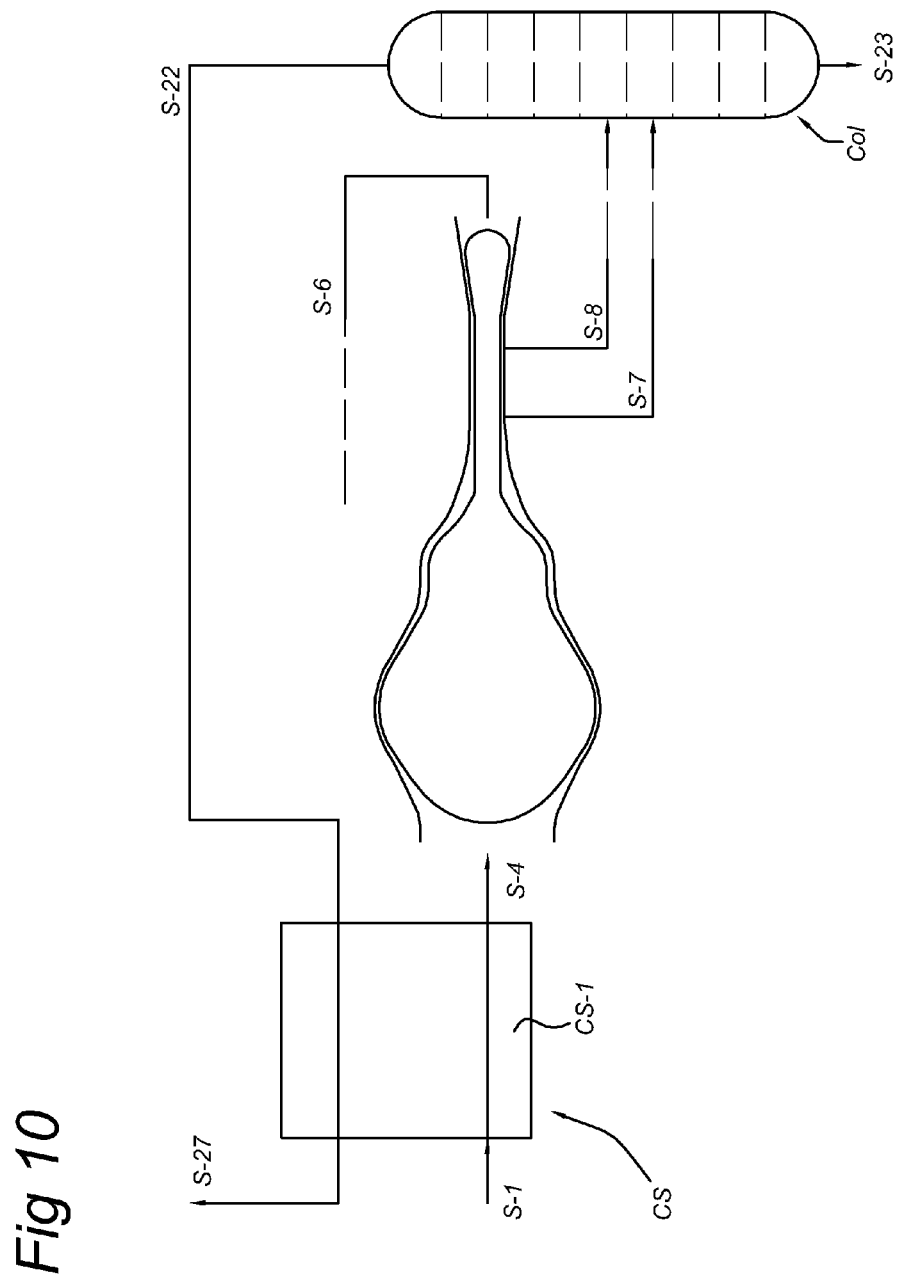
Figure 11:
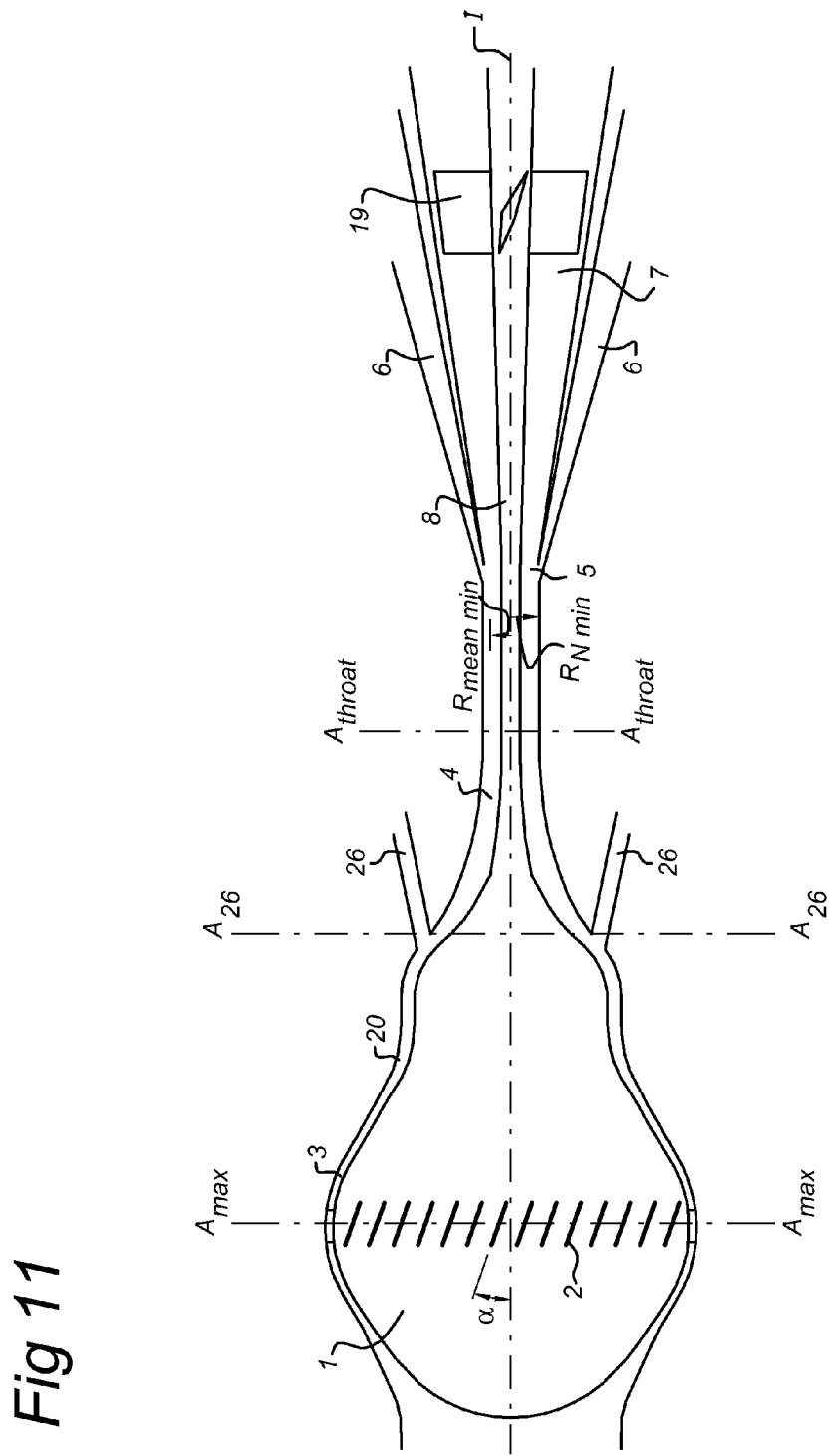
Figure 12:
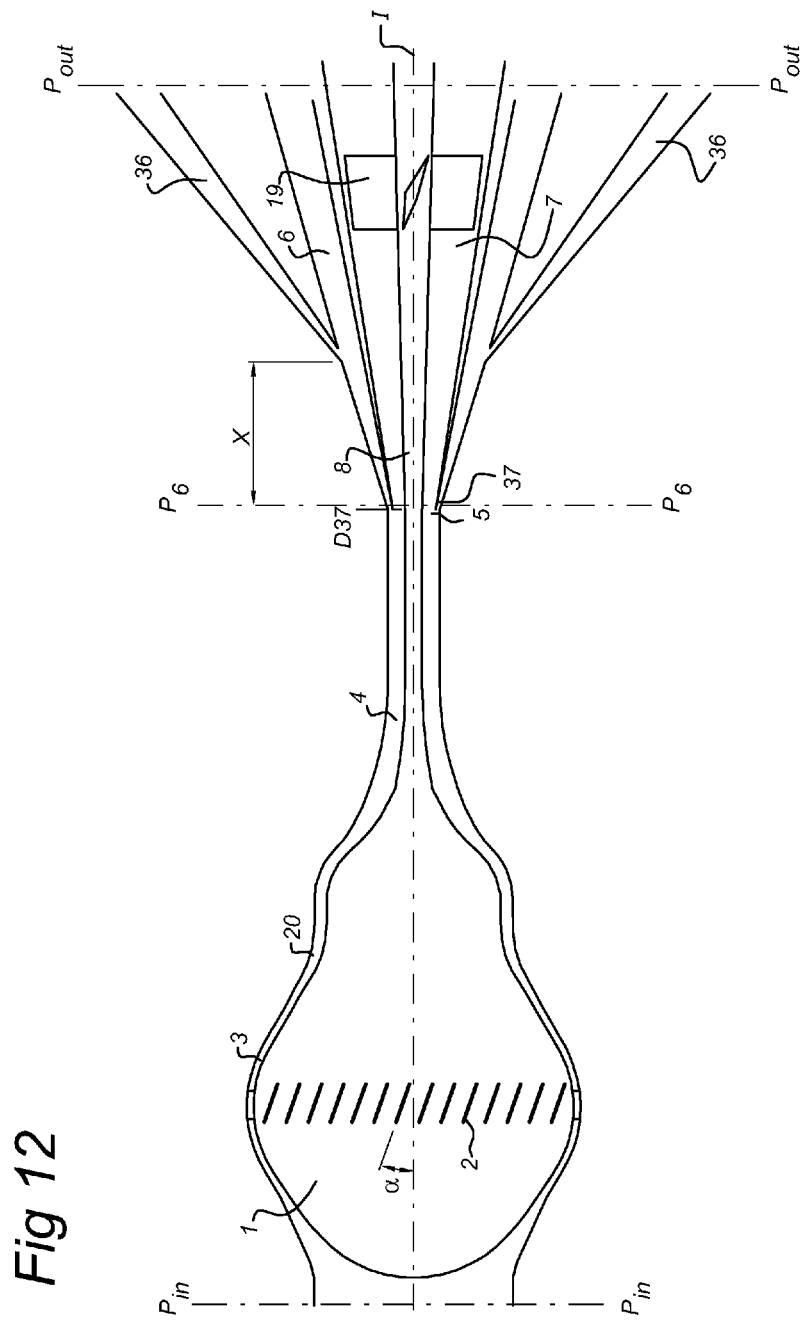

Embodiments will now be described, by way of example only, with reference to the accompanying schematic drawings in which corresponding reference symbols indicate corresponding parts, and in which:

FIG. 1 schematically depicts a longitudinal sectional view of a cyclonic separator, FIGS. 2a and 2b schematically depict a phase diagram, FIGS. 3, 4, 5 schematically depict a cyclonic fluid separator according to different embodiments, FIGS. 6 and 7 schematically depict a cyclonic fluid separator according to an embodiment, FIGS. 8a and 8b schematically depict a cyclonic fluid separator according to two embodiments, FIGS. 9 and 10 schematically depict a separation system according to embodiments and FIGS. 11, 12 schematically depict cyclonic fluid separators according to further different embodiments.

DETAILED DESCRIPTION

As an example, FIG. 1 depicts a longitudinal sectional view of a fluid separator, which may also be referred to as a cyclonic separator, a cyclonic inertia separator, a cyclonic fluid separator.

Referring now to FIG. 1, there is shown a cyclonic inertia separator which comprises a swirl inlet device comprising a pear-shaped central body 1 on which a series of swirl imparting vanes 2 is mounted and which is arranged coaxial to a central axis I of the cyclonic separator and inside the cyclonic separator such that an annular flow path 3 is created between the central body 1 and separator housing 20.

The width of the annulus 3 is designed such that the cross-sectional area of the annulus gradually decreases downstream of the swirl imparting vanes 2 such that in use the fluid velocity in the annulus gradually increases and reaches a supersonic speed at a location downstream of the swirl imparting vanes.

The cyclonic separator further comprises a tubular throat portion 4 from which, in use, the swirling fluid stream is discharged into a diverging fluid separation chamber 5 which is equipped with a central primary outlet conduit 7 for gaseous components and with an outer secondary outlet conduit 6 for condensables enriched fluid components. The central body 1 has a substantially cylindrical elongated tail section 8 on which an assembly of flow straightening blades 19 is mounted. The central body 1 has a largest outer width or diameter $2R_{o\,max}$ which is larger than the smallest inner width or diameter $2R_{n\,min}$ of the tubular throat portion 4.

The tubular throat portion 4 comprises the part of the annulus 3 having the smallest cross-sectional area. The maximum diameter of the central body 1 is larger than the minimum diameter of the tubular throat portion 4.

The various components of the cyclonic separator as shown in FIG. 1 are described below.

The swirl imparting vanes 2 which are oriented at an angle ($\alpha$) relative to the central axis I to create a circulation in the fluid stream. The angle $\alpha$ may be between 20° and 60°. The fluid stream is subsequently induced to flow into the annular flow area 3. The cross-sectional surface of this area is defined as:

$$A_{annulus} = \pi(R_{outer}^2 - R_{inner}^2)$$

The latter two being the outer radius and inner radius of the annulus at a selected location. The mean radius of the annulus at that location is defined as:

$$R_{mean} = \sqrt{[\tfrac{1}{2}(R_{outer}^2 + R_{inner}^2)]}.$$

At the maximum value of the mean annulus radius $R_{mean,\,max}$ the fluid stream is flowing between the assembly of swirl imparting vanes 2 at a velocity (U), which vanes deflect the flow direction of the fluid stream proportional to the deflection angle ($\alpha$) and so obtaining a tangential velocity component which equals $U_\phi = U \cdot \sin(\alpha)$ and an axial velocity component $U_x = U \cdot \cos(\alpha)$.

In the annular space 3 downstream of the swirl imparting vanes 2 the swirling fluid stream is expanded to high velocities, wherein the mean annulus radius is gradually decreasing from $R_{mean,\,max}$ to $R_{mean,\,min}$.

It is considered that during this annular expansion two processes occur:

(1) The heat or enthalpy (h) in the flow decreases with the amount $\Delta h = -\tfrac{1}{2} U^2$, thereby condensing those flow constituents which first reach phase equilibrium. This results in a swirling mist flow containing small liquid or solid particles.

(2) The tangential velocity component $U_\phi$ increases inversely with the mean annulus radius substantially in accordance with the equation $$U_{\phi,final} = U_{\phi,\,initial}(R_{mean,\,max}/R_{mean,\,min}).$$

This results in a strong increase of the centrifugal acceleration of the fluid particles ($a_c$), which will finally be in the order of:

$$a_c = (U_{\phi,final}^2 / R_{mean,\,min}).$$

In the tubular throat portion 4 the fluid stream may be induced to further expand to higher velocity or be kept at a substantially constant speed. In the first case condensation is ongoing and particles will gain mass. In the latter case condensation is about to stop after a defined relaxation time. In both cases the centrifugal action causes the particles to drift to the outer circumference of the flow area adjacent to the inner wall of the separator housing 20, which is called the separation area. The time period for the particles to drift to this outer circumference of the flow area determines the length of the tubular throat portion 4. It is understood that particles may include solid or solidified particles.

Downstream of the tubular throat portion 4 the condensables enriched 'wet' fluid components tend to concentrate adjacent to the inner surface of the diverging fluid separation chamber 5 and the 'dry' gaseous fluid components are concentrated at or near the central axis I, whereupon the wet condensables enriched 'wet' fluid components are discharged into an outer secondary fluid outlet 6 via one slot, a series of slots, or (micro) porous portions whereas the 'dry' gaseous components are discharged into the central primary fluid outlet conduit 7.

In the diverging primary fluid outlet conduit 7 the fluid stream is further decelerated so that the remaining kinetic energy is transformed into potential energy.

The diverging primary outlet conduit may be equipped with an assembly of flow straightening means, such as flow straightening vanes 19 to recover the circulation energy.

The term fluid as used here refers to the liquid, the gaseous phase, as well as a combination of liquid and gaseous phases. Fluids as defined here could also be laden with solid particles.

The swirl imparting vanes 2 may be replaced with other suitable swirl imparting devices. For instance, the swirl imparting vanes 2 may be formed by providing a tangential inflow of the fluid.

The flow straightening vanes 9 may be replaced with other suitable flow straightening devices.

As will be understood, the cyclonic separator is substantially rotational symmetrical with respect to the central axis I.

It is emphasized that the above described cyclonic separator is just an example and the embodiments described below may also be applied in other type of cyclonic separators, such as the one discussed with reference to WO00/23757.

EMBODIMENTS

FIG. 2a schematically depicts a phase diagram showing a dew point curve for a hydrocarbon mixture. The phase diagram is a pressure-temperature diagram, showing the different phases of the hydrocarbon mixture: liquid L, gas G and the mixed phase comprising liquid and gas L+G. The line separating the mixed phase L+G from the liquid L is called the bubble point line BP. The line separating the mixed phase L+G from the gas G is the dew point line DP. The dew point line and the bubble point line meet at the critical point CP.

Schematically, the process as takes place in the cyclonic fluid separator is indicated by the line A-B. The fluid enters the cyclonic fluid separator in the gas phase (point A) and travels through the phase diagram to point B, where it is a mix of liquid and gas (point B). In between point A and B, the process crosses the dew point line DP where condensation starts.

Is it emphasized here that the phase diagram as shown in FIG. 2a is typical for a fluid being a mixture of different components, such as hydrocarbon components. The composition of the mixture determines the position of the critical point CP and the position and shape of the bubble point line BP and the dew point line DP.

When the process passes the dew point line DP, entering the liquid and gas L+G region, liquid will form. With decreasing temperature T and decreasing pressure P, i.e. following line AB, the composition of the liquid will change. The term composition is usually defined as the sum of fractions (molar/mass based) of the total mixture of components I=1, ..., N.

It is emphasized that although different pure components may have different dew point temperatures, this does not result in the subsequent condensation of the different components when following line AB in the mixture of these components. Instead, when passing the dew point line DP, right away, the liquid that is formed comprises a mixture of components, the composition of which will change when progressing further towards point B.

For instance as suggested in prior art document WO0023757(A1) a cyclonic fluid separator is described comprising "a plurality of separation means e.g. annular slots, the separation means e.g. annular slot of the i-th component being located at a distance Li, in use, from the dewpoint of the condensed gas component, where Li=Vi.Ti, where Vi is the speed, in use of the gas flow at the dewpoint of the i-th gas component and Ti is the time taken, in use for condensed droplets of the i-th gas component to travel from the axis of the nozzle to a wall of the working section. According to WO0023757 the individual components present in the mixture are separated with a plurality of separation means, by subsequent condensation and separation of the highest boiling component via the first separation means and the second highest boiling component in the second separation means etc.

However, the embodiments as presented here are based on the insight of the applicant that such a split of a gaseous mixture into pure liquefied components as described in the WO0023757 is physically impossible. Reworking example 3 of WO0023757 by the present applicant did not result in pure components (butane, propane, methane), but resulted in three different mixtures of these components.

Concluding from the above, it was found that no significant fractionation of components takes place in these very good miscible mixtures of methane, ethane, propane and butane.

The embodiments as presented here are based on the insight that FIG. 2 can not be composed of the individual boiling lines of the different components. At the relevant pressures (e.g. 65 atm) the molecular interactions between the different components are too strong to assume ideal phase behaviour. As a consequence vapour components with a lower condensation temperature can dissolve in the liquid of a component with a higher condensation temperature. Thus the phase boundaries of the components merge into one effective phase boundary valid for the mixture as a whole. Such a phase boundary for a mixture is shown in FIG. 2a.

Thus, it is physically impossible to obtain pure component liquid fractions in a supersonic separator as suggested in WO0023757(A1). For such a sharp cut fractionation as suggested in WO0023757(A1) one would need to apply re-boilers and reflux condensers. There is no teaching of the use of these methods in WO0023757.

The present invention is based on the insight that pure component fractionation is not achieved with the embodiments provided in WO00023757. Therefore, embodiments are provided here that use this insight to provide an improved cyclonic fluid separator.

The dashed lines shown in FIG. 2a represent positions within the phase diagram which have a similar liquid composition. Thus, travelling from the dew point line DP to point B (along path AB) the composition changes of the liquid obtained via the outer secondary outlet conduit 6 for condensables enriched fluid components. For instance, at position 1 along path AB the composition of the liquid may be 90% ethane and 10% methane, where at position 2 along path AB the composition of the liquid may be 60% ethane and 40% methane. Of course, this is a simple example only mentioning two components, where in practise, the composition may comprise many more components (ethane, methane, propane, butane, etc.).

This insight is used to provide an improved cyclonic fluid separator as will be apparent from the embodiments provided below.

Embodiment 1

So, according to a first embodiment (see FIG. 3) a cyclonic fluid separator is provided comprising a central primary outlet conduit 7 for gaseous components and an outer secondary outlet conduit 6 for condensables enriched fluid components as explained above with reference to FIG. 1 and comprising a further outer secondary outlet conduit 16. This further outer secondary outlet conduit 16 may be used for condensables enriched fluid components.

The outer secondary outlet conduit 6 may be positioned on a first position along the central axis I of the separator and the further outer secondary outlet conduit 16 may be positioned on a second position along the central axis I of the separator. Both the first and second position may be downstream with respect to the throat portion.

Accordingly, instead of two outer secondary outlet conduits 6, 16, any number of secondary outlets may be provided on respective further positions along the central axis I of the cyclonic fluid separator, downstream with respect to the throat portion 4.

According to an embodiment, there is provided a cyclonic fluid separator, comprising a plurality of further outer secondary outlets positioned on respective further positions along the central axis (I) of the cyclonic fluid separator.

A cyclonic fluid separator with two or more outer secondary outlet conduits 6, 16 positioned at different positions along the central axis I, may be referred to as a multi-stage cyclonic fluid separator. The multi-stage cyclonic fluid separator may comprise n stages (outer secondary outlet conduits), where n is a natural number equal to or larger than 2.

The outer secondary outlet conduits 6, 16 may be provided by providing annular slots 22 in the housing of the cyclonic fluid separator. The annular slots 22 are created by using conical shaped tubes (forming outer secondary outlet conduits 6, 16) protruding in the vortex flow at different positions in the cyclonic fluid separator. Inlet edges 23 of these conical tubes are sharp as to minimize the flow disturbances (e.g. boundary layer detachment, shocks, etc).

An advantage of a multi-stage cyclonic fluid separator is that the liquid hold-up in the high speed section of the cyclonic fluid separator is reduced and thereby the energetic losses are also reduced. Liquid that is formed is removed from the cyclonic fluid separator at an early stage, and therefore does not disturb or hold-up the fluid flow further downstream. For instance, in case of a multi-stage cyclonic fluid separator liquid that is formed early (for instance near the throat portion 4) does not disturb or hold-up the fluid flow downstream of the (first) outer secondary outlet conduit 6. This may optimize further downstream processes, such as further fractionating processes.

A multi-stage cyclonic fluid separator has the ability to apply deep expansion to a fluid containing a (potentially) large amount of liquid without generating excessive pressure drops along the separator geometry. This excessive pressure drop, typical for two-phase flow, is actually prevented by removing liquid (first outer secondary outlet conduit) formed during initial (subsonic) expansion before starting supersonic expansion. Furthermore, withdrawal of natural gas liquids already formed "halfway" the expansion process by a secondary outlet conduit shifts the equilibrium in a way which favours liquefaction of additional natural gas liquids.

According to a further embodiment the first flow may be obtained from the first position where the local axial Mach number is below one and the second flow may be obtained from the second position where the local axial Mach number is equal to or greater than one. The first position may be upstream with respect to the second position.

The secondary outlets may be recombined after the cyclonic fluid separator or may be kept separated. In both cases, the multi stage cyclonic fluid separator will be advantageous as it achieves a higher fluid yield than a single stage cyclonic fluid separator.

By providing a multi-stage cyclonic fluid separator, gases with a high liquid fraction (such as hydrocarbon rich feed gases) can be handled advantageously with relatively low pressure loss, while generating for instance a methane depleted fluid flow and a methane enriched fluid flow.

FIG. 2b shows the impact of this embodiment in a phase diagram. Path AB is now replaced with path A-B1-B2. B1 corresponds to the first outlet (counted in the direction of the flow). Since at this position, matter is actually removed, a new phase envelop (dew point line DP2) is created. So, further expansion will lead to point B2 instead of former point B. The slope (dP/dT) of the expansion line is a measure for the isentropic efficiency. The smaller the slope the higher the isentropic efficiency, i.e. more temperature drop for a given pressure drop. By intermediate separation at point B1 less liquid will enter the second expansion step along the curve B1-B2 which reduces frictional losses, whilst more new liquids are created due more temperature drop. Hence, the expansion along curve B1-B2 is more efficient than the expansion along the initial expansion curve A-B belonging to a single stage process, According to an example, saturated feed gas enters the cyclonic fluid separator at a pressure of 90 bar and a temperature of −41° C. The gas passes the swirl imparting vanes 2 and travels towards the throat portion 4. After passing the throat portion 4 the gas reaches the outer secondary outlet conduit 6 at a pressure of 54 bar and a temperature of −63°. The outer secondary outlet conduit 6 skims off a first condensables enriched fluid and recovers pressure, resulting in an output flow at a pressure of 54-70 bar.

Next, the gas reaches the further outer secondary outlet conduit 16 at a pressure of 25 bar and a temperature of −92°. The further outer secondary outlet conduit 16 skims off a second condensables enriched fluid and recovers pressure, resulting in an output flow at a pressure of 54 bar. The first condensables enriched fluid will comprise relatively much liquids with a high boiling point, where the second condensables enriched fluid will comprise relatively much liquids with a low boiling point.

So, the result of this embodiment is the production of different liquid mixtures with different molecular weights. The upstream slots (close to the throat portion 4) produce a liquid mixture with the highest molecular weight (e.g. methane lean) where as the downstream slots produce a liquid mixture with lowest molecular weight (e.g. methane rich).

A further result of this embodiment is that the total amount of liquid that is withdrawn is relatively high, i.e. higher than when using a single stage cyclonic fluid separator.

There is provided a cyclonic fluid separator comprising a throat portion 4 which is arranged between a converging fluid inlet section and a diverging fluid outlet section, the cyclonic fluid separator being arranged to facilitate a cyclonic flow through the converging fluid inlet section and the throat portion towards the diverging fluid outlet section in a downstream direction, the diverging fluid outlet section comprising an inner primary outlet conduit 7 for condensables depleted fluid components and an outer secondary outlet conduit 6 for condensables enriched fluid components, wherein the cyclonic fluid separator comprises a further outer secondary outlet conduit 16, the outer secondary outlet conduit 6 positioned on a first position along a central axis I of the cyclonic fluid separator and the further outer secondary outlet conduit 16 positioned on a second position along the central axis I of the cyclonic fluid separator.

Also provided is a method of separating liquids from a compressible fluid flow comprising providing a cyclonic fluid flow to a cyclonic fluid separator comprising a converging fluid inlet section, a throat portion 4 and a diverging fluid outlet section respectively, obtaining a first flow from an outer secondary outlet 6 at a first position along a central axis I of the cyclonic fluid separator, and obtaining a third flow from an inner primary outlet conduit 7.

characterized by obtaining a second flow from a further outer secondary outlet 16 at a second position along a central axis I of the cyclonic fluid separator.

The first position and the second position may be in the diverging fluid outlet section. The maximum diameter of the central body 1 may be larger than the minimum diameter of the tubular throat portion 4.

The multi-stage cyclonic fluid separator described above may be equipped with two separation stages, i.e. the (first) outer secondary outlet conduit 6 and the further outer secondary outlet conduit 16. The stages are located at different axial locations along the expansion geometry of the cyclonic fluid separator, thereby enabling vapour/liquid separation at two expansion pressures.

According to an example, the first separation may take place at subsonic fluid speeds, withdrawing typically 20% of the fluid, of which approximately 50% in liquid phase and about 50% in vapour phase.

The second separation takes place at supersonic fluid speeds, withdrawing (approx.) 30% of the fluid in liquid (approx. 50%) and vapour phase (approx. 50%).

Both the first and the second separation do not result in pure fractions (i.e. comprising a single component), but result in a mixture.

The separation streams (the streams via the outer secondary outlet conduit 6 and the further outer secondary outlet conduit 16) add up to approximately 98% of the total amount of NGL's introduced to the cyclonic fluid separator, which is high when compared to a single stage cyclonic fluid separator. The remainder of the fluid (approx. 56%) is a superheated vapour, deprived from NGL's.

According to an example, in use, the outer secondary outlet conduit 6 may be in a subsonic region of the flow and the further outer secondary outlet conduit 16 may be in a supersonic region of the flow.

The cooling inside the cyclonic fluid separator as described above is established by accelerating the feed stream to supersonic velocity. At supersonic condition the pressure has dropped to typically a factor ¼ of the feed pressure, meanwhile the temperature drops to typically a factor ⅓ with respect to the feed temperature. The ratio of T-drop per unit P-drop for a given feed composition is determined with the isentropic efficiency of the expansion which may be around 85%. The isentropic efficiency expresses the frictional and heat losses occurring inside the cyclonic fluid separator.

FIG. 3 shows both the (first) outer secondary outlet conduit 6 and the further outer secondary outlet conduit 16 being positioned downstream of the throat portion 4. However, as will be explained in a further embodiment below, a further outer secondary outlet conduit may also be positioned upstream of the throat portion 4.

Embodiment 2

A further embodiment will be described with reference to FIG. 4.

The fluid as received by the cyclonic separator may comprise a mixture of gaseous components (methane, ethane, propane, butane, etc.). However, the fluid entering the cyclonic separator may also comprise liquid components, such as water, liquefied hydrocarbons. These liquid components entering the cyclonic separator will be referred to as free liquids.

Furthermore, the fluid entering the cyclonic separator may also comprise solid components, such as dust particles, hydrates, ice, debris. These solid components entering the cyclonic separator will be referred to as free solids.

Both the free liquids and the free solids pass through the cyclonic fluid separator and will be separated from the flow through the central primary outlet conduit 7 as a result of the centrifugal force at the outer secondary outlet conduit 6 as shown in FIG. 1. However, these free liquids and solids have a negative impact on the efficiency of the cyclonic fluid separator, because:

the free solids may damage the inner wall of the separator,
the intended end-products of the cyclonic fluid separator usually do not comprise free liquids and/or solids,
free liquids and/or solids cause hold-up in the system whereby losses are highest in the high-speed section,
hydrates may stick to the wall creating a relatively high hold-up volume to which losses are proportional.

Therefore it is an object to provide an embodiment that overcomes at least one of these negative effects of the presence of free liquids and/or solids in the fluid entering the separator.

FIG. 4 schematically depicts a longitudinal sectional view of a cyclonic fluid separator according to an embodiment. As shown in FIG. 4, there is provided a cyclonic fluid separator comprising a throat portion 4 which is arranged between a converging fluid inlet section and a diverging fluid outlet section, the cyclonic fluid separator being arranged to facilitate a cyclonic flow through the converging fluid inlet section and the throat portion towards the diverging fluid outlet section in a downstream direction, the diverging fluid outlet section comprising an inner primary outlet conduit 7 for condensables depleted fluid components and an outer secondary outlet conduit 6 for condensables enriched fluid components, wherein the cyclonic fluid separator comprises a further outer secondary outlet conduit 17, the outer secondary outlet conduit 6 positioned on a first position along a central axis I of the cyclonic fluid separator and the further outer secondary outlet conduit 17 positioned on a second position along the central axis I of the cyclonic fluid separator, wherein the first position is downstream with respect to the throat portion 4 and the second position is upstream with respect to the throat portion 4.

The second position may be upstream with respect to the throat portion 4 and downstream with respect to the swirl imparting vanes 2.

Also, the second position may be upstream with respect to the throat portion 4 and downstream with respect to the position of maximum value of the mean annulus radius $R_{mean, max}$ of the annular space 3 provided between the pear-shaped central body 1 and the separator housing 20.

At the second position a further outer secondary outlet conduit 17 is provided as shown in FIG. 4. The further outer secondary outlet conduit 17 is arranged to output the free liquids and/or solids, so may also be referred to as free liquids and solids outlet conduit 17.

At the second position upstream with respect to the throat portion 4, the fluid has a tangential velocity component $U_\phi$ with respect to the central axis I as described above. As a result of this tangential velocity component and corresponding centrifugal acceleration ($a_c$) the free particles are forced to the (outer wall of the) separator housing 20 of the cyclonic fluid separator and will leave via the further outer secondary outlet conduit 17.

At the same time, the axial velocity component $U_x$ is relatively low in between the swirl imparting device 2 and the tubular throat portion 4 so the free liquids and/or solids may not severely damage the cyclonic fluid separator upstream of the further outer secondary outlet conduit 17.

As shown in FIG. 4, the further outer secondary outlet conduit 17 provided upstream of the throat may be connected to a reservoir 40, in which the level of liquid (and solids) is kept constant by using a level control unit 41, connected to a valve 42 downstream of the reservoir 40. Gas that may be present in the reservoir 40 will diffuse back into the cyclonic fluid separator.

According to this embodiment, the first position (of the outer secondary outlet conduit (6)) is in the diverging fluid outlet section and the second position (of the further outer secondary outlet conduit (17)) is in the converging fluid inlet section.

According to an embodiment, the maximum cross sectional flow area of the cyclonic fluid separator, which may coincide with the position of the swirl imparting vanes 2, is $A_{max}$ and the cross sectional flow area of the cyclonic fluid separator at the position of the further outer secondary outlet conduit 17 is $A_{17}$ and the following applies for the second position:

$$\frac{A_{max}}{A_{17}} < 2.$$

This region will correspond to the region before expansion, i.e. where in use the speed of the flow is typically below 0.3 Mach. Additionally, in this region the flow is not a compressible fluid. Thus, in this region substantially no condensation occurs.

By providing an outer secondary outlet conduit 17 upstream of the throat portion 4, free liquids and/or solids that may be present in the fluid flow entering the cyclonic fluid separator may be removed, thereby reducing the negative impact of the free liquids and/or solids as mentioned above.

Of course, according to a further embodiment, more than two outer secondary outlet conduits may be provided, where at least one is positioned upstream of the throat 4 and at least one is positioned downstream of the throat 4.

Embodiment 3

Cyclonic fluid separators as described here are often used as part of a system for separating liquids from a compressible fluid flow. Such a system may for instance comprise a cyclonic fluid separator and a further separation device positioned downstream of the cyclonic fluid separator.

The outer secondary outlet conduit 6 of a cyclonic fluid separator as shown in FIG. 1 may be connected to such a further fluid separator to supply a flow of condensables enriched fluid components to the further separation device.

The further separation device may be a fractionation column as known to a skilled person. Fractionation columns (also known as "distillation towers" or "distillation columns") are columns comprising different trays provided at different (vertical) levels within the fractionation column. In steady-state operation, each tray is filled with liquid. The fractionation column is heated from the bottom.

According to an alternative, instead of a fractionation column it is possible to use other separation columns instead, such as a packed column, in-line columns, in-line contactor (Rapter).

Components will travel upwards as vapour from one tray to the next by evaporation and subsequent condensation at the next tray level. Components will travel downwards as liquid from one tray to the next as a tray overflows. As a result, components with a low boiling point substantially end up at the highest tray and components with a high boiling point substantially end up at the lowest tray.

The temperature in the fractionation column decreases from bottom to top. Also, the composition of the liquid in the trays is different on each level. Usually the fractionation column is fed with a flow comprising both low and high boiling components. This feed flow is usually supplied to one of the trays half way the fractionation column which contain a similar ratio of low and high boiling components as the feed flow.

FIG. 5 shows an embodiment of a system comprising a cyclonic fluid separator and a fractionation column COL-1. The cyclonic fluid separator may be as described above, i.e., a cyclonic fluid separator comprising a throat portion 4 which is arranged between a converging fluid inlet section and a diverging fluid outlet section, the cyclonic fluid separator being arranged to facilitate a cyclonic flow through the converging fluid inlet section and the throat portion towards the diverging fluid outlet section in a downstream direction, the diverging fluid outlet section comprising an inner primary outlet conduit 7 for condensables depleted fluid components and an outer secondary outlet conduit 6 for condensables enriched fluid components, wherein the cyclonic fluid separator comprises a further outer secondary outlet conduit 16, the outer secondary outlet conduit 6 positioned on a first position along a central axis I of the cyclonic fluid separator and the further outer secondary outlet conduit 16 positioned on a second position along the central axis I of the cyclonic fluid separator. The maximum diameter of the central body 1 is larger than the minimum diameter of the tubular throat portion 4. Also, the first position and the second position are in the diverging fluid outlet section.

The fractionation column COL-1 comprises a plurality of trays 31 provided at different (vertical) levels within the fractionation column COL-1.

A first flow may be obtained from the outer secondary outlet conduit 6 at a first position along a central axis I of the cyclonic fluid separator and a second flow may be obtained from at least one further outer secondary outlet 16 at a second position along a central axis I of the cyclonic fluid separator, the second position being further downstream than the first position. The first flow comprises relatively more components with a high boiling point compared to the second flow. For instance, the first flow may comprise relatively much ethane, where the second flow may comprise relatively much methane.

The first flow is fed to a specific tray at a first level within the fractionation column COL-1 and the second flow is fed to a specific tray at a second level within the fractionation column COL-1. Since the first flow comprises more components with a relatively high boiling point and has a higher temperature, the first level is lower than the second level.

In order to connect the outer secondary outlet conduits 6, 16 to the fractionation column COL-1, ducts 32, 33 may be provided.

So, according to an embodiment there is provided a system for separating liquids from an inlet feed S-1 comprising a compressible fluid flow, the system comprising a cyclonic fluid separator as described above and a fractionation column COL-1, where
the outer secondary outlet 6 positioned on the first position is connected to a first level within the fractionation column COL-1 and
the further outer secondary outlet 16 positioned on the second position is connected to a second level within the fractionation column COL-1,
the first position being upstream with respect to the second position and the first level being lower than the second level.

Also provided is a method for separating liquids from an inlet feed S-1 comprising a compressible fluid flow, the method using a cyclonic fluid separator according to claim 16 and a fractionation column COL-1, the method comprises
obtaining via the outer secondary outlet 6 positioned on the first position a flow that is fed to a first level within the fractionation column COL-1 and
obtaining via the further outer secondary outlet 16 positioned on the second position a flow that is fed to a second level within the fractionation column COL-1,
the first position being upstream with respect to the second position and the first level being lower than the second level.

The levels may be chosen in such a way that in use the composition of the fluid flow obtained from the outer secondary outlet conduit 6 at the first position substantially matches the composition and/or the temperature of the liquid at the first level within the fractionation column COL-1 and the composition of the fluid flow obtained from the further outer secondary outlet conduit 16 at the second position matches the composition of the liquid at the second level within the fractionation column.

Of course, according to a further embodiment, in case more than two outer secondary outlet conduits are provided, each outer secondary outlet conduit may be connected to its own corresponding level within the fractionation column COL-1.

It will be understood that a connection to a fractionation column COL-1 as described above is not needed in case pure component fractionation would be possible with the cyclonic fluid separator. However, as explained above, it is not possible to obtain pure component fractionation with a multistage cyclonic fluid separator as described here as claimed in WO00/23757.

Embodiment 4

Earlier patent applications filed by the applicant of the current application, having PCT application number PCT/NL2008/050172 and European patent application number 07104888.8 describe a cyclonic fluid separator according to FIG. 1, without elongated tail end 8.

These patent documents identify the problem that the central body 1 and its elongated tail end 8 need to be mounted tightly, possibly in combination with applying a prestressing force/pretension load to prevent unwanted oscillations. This is cumbersome because it requires complex clamp constructions at the outer ends of the central body 1 and elongated tail end 8. Furthermore, to transfer these large prestressing forces/pretension loads from the central body 1 to the separator requires large mounting means between these parts, inducing unwanted friction losses and flow disturbances. The earlier patent document describes a cyclonic fluid separator comprising central body 1 as described above with reference to FIG. 1, but does not comprise an elongated tail section 8. Instead, the central body comprises an outlet 13 directed towards the tubular throat portion 4, arranged to add a central flow towards the throat portion 4. This central flow takes over the role of the elongated tail section 8 (preventing vortex breakdown), but overcomes some disadvantages associated with such an elongated tail section 8, such as the disadvantages described above.

According to these earlier patent documents (PCT/NL2008/050172 and EP application number 07104888.8) there is provided a cyclonic fluid separator comprising
a throat portion 4 which is arranged between a converging fluid inlet section and a diverging fluid outlet section, the diverging fluid outlet section comprising an inner primary outlet 7 for condensables depleted fluid components and an outer secondary outlet for condensables enriched fluid components 6; and
a central body 10 provided upstream of the throat portion 4 in the fluid inlet section, the central body 10 being arranged substantially coaxial to a central axis I of the fluid separator,
the fluid separator being arranged to facilitate a main flow through the converging fluid inlet section and the throat portion towards the diverging fluid outlet section,
wherein the central body 10 comprises an outlet 13, directed towards the tubular throat portion 4 and arranged to add a central flow towards the throat portion 4. This is schematically shown in FIG. 6.

The maximum diameter of the central body 10 may be larger than the minimum diameter of the tubular throat portion 4.

FIG. 6 shows a cross sectional view of a fluid separator. Same reference numbers are used to denote same items as above. Again, a pear-shaped central body 10 on which a series of swirl imparting vanes 2 is mounted is provided. The central body 10 is arranged coaxially to a central axis I of the fluid separator and inside the separator such that an annular flow path 3 is created between the central body 10 and the separator housing 20. The fluid flow entering the fluid separator through this annular flow path will be referred to as the main flow. The fluid separator further comprises a tubular throat portion 4, a diverging fluid separation chamber 5 which is equipped with a central primary outlet conduit 7 for gaseous components and with an outer secondary outlet conduit 6 for condensables enriched fluid components.

According to this embodiment, the central body 10 does not comprise an elongated tail section 8 as in FIG. 1. Instead thereof, the central body 10 comprises an outlet 13. The outlet 13 is positioned on the downstream side of the central body 10, directed towards the throat portion 4. The position and direction of the outlet 13 substantially coincides with the central axis I. The outlet 13 is arranged to add a central flow to the cyclonic fluid separator 1. The outlet 13 may also be referred to as a central outlet 13.

A duct 12 may be provided to provide the outlet 13 with a fluid flow, as shown in FIG. 6. The duct may provide a fluid flow originating from a suitable source, which may be outside of the cyclonic fluid separator.

In use, the central flow substantially coincides with the central axis I and is surrounded by the main flow. The central flow may be a swirling flow.

The central fluid flow provided by the outlet 13 ensures that the main flow remains stable throughout the fluid separator. The central flow plays a role similar to the substantially cylindrical elongate tail section 8 as described above with reference to FIG. 1 in that the central flow prevents vortex breakdown at the central axis of main flow.

Since the central flow is not a rigid object (as tail section 8) and moves in the same direction as the main flow, friction between the central flow and the main flow is relatively low. This contributes to the efficiency of the fluid separator.

The central body 10 may have a substantially circular shape in a cross-axial direction and comprises upstream of the swirl imparting device 2 a nose section of which the diameter gradually increases such that the degree of diameter increase gradually decreases in downstream direction, and the central body 10 further comprises downstream of the swirl imparting device a section of which the diameter gradually decreases in downstream direction. This is shown in FIG. 6, showing a substantially pear-shaped central body 10.

The fluid separator may comprise a housing 20 in which the central body 10 is arranged such that an annulus 3 is present between an inner surface of the housing 20 and an outer surface of the central body 10.

A number of spokes 21 may be provided between the housing 20 and the central body 10, to mount the central body 10. So, there is provided a fluid separator comprising a housing 20 in which the central body 10 is mounted by a number of spokes 21.

According to an embodiment, the spokes 21 are provided upstream of the swirl imparting means 2, such that the spokes 21 have less negative effect on the main flow. According to an alternative, the swirl imparting means 2 and the spokes 21 are integrated into a single part. According to an embodiment (not shown in the figures), duct 12 may pass through the inside of one or more of the spokes 21 or one or more of the swirl imparting means 2 towards a supply.

The fluid separator may comprise an outlet 13 which comprises a swirl imparting device for creating a swirling motion of the central flow within at least part of the fluid separator. The swirl imparting device may be formed by one of a number of swirl imparting vanes 14, e.g. a turbine, a tangential inlet, etc. This is schematically shown in FIG. 7, showing a cross sectional view of the central body 10 according to an embodiment. The swirl provided to the central flow may be lower than the swirl of the main flow (i.e. less rotations per second or less rotations per unit axial distance along the central axis I, such that vortex breakdown of the central flow does not occur). By adding a swirl to the central flow, the velocity gradient in the tangential direction between the central flow and the main flow is reduced, resulting in less friction. Furthermore, adding a swirl to the central flow improves the stability of the mixed flow occurring after the central flow mingles with the outer main flow.

Hence, the central flow momentum will be propelled by the outer main flow in both axial and tangential direction. Now, the function of the prior art elongated tail end 8 (i.e. to prevent further tangential acceleration causing vortex breakdown) is replaced by the gaseous central flow. Instead of frictional dissipation of momentum at the boundary of the elongated tail end 8, part of the main flow momentum is used (i.e. transferred) to propel the central gas flow.

The swirl imparting device in the outlet 13 may be formed to provide the central flow with a swirl or rotation in the same direction as the central flow, also referred to as co-current mode.

According to an alternative, the swirl imparting device in the outlet 13 may be formed to provide the central flow with a swirl or rotation in the opposite direction as the central flow, i.e. a counter current mode. A counter current mode may be considered to progressively dissipate the tangential momentum in the main flow.

The embodiments described here with reference to FIGS. 6 and 7 may be used in combination with the other embodiments described here about multi-stage cyclonic fluid separators, such as described with reference to FIG. 3.

According to an embodiment (not shown), the further outer secondary outlet conduit 16, which is located furthest downstream with respect to the (first) outer secondary outlet conduit 6, is arranged to couple at least part of the flow to the outlet 13.

According to a further embodiment and as shown in FIG. 8a, the (first) outer secondary outlet conduit 6, which is located upstream with respect to the (second) outer secondary outlet conduit 16, is arranged to couple at least part of the flow to the outlet 13.

A gas-liquid reservoir 11 may be provided to collect the fluid flow from the first and/or further outer secondary outlet conduit 16 with condensables enriched fluid components. These fluid flows mainly comprise liquids and/or solids that are separated from the fluid flow by the cyclonic fluid separator. This liquid L is collected in the gas-liquid reservoir 11. Gaseous components G may be present in the gas-liquid reservoir 11. Also, the liquid L in the gas-liquid reservoir 11 may evaporate forming gaseous components G. Therefore, the gas-liquid reservoir 11 may be equipped with means for separating the liquid fraction from the gas fraction. Suitable separation means can comprise: swirl tubes, mist mats, vane-type demisters etc.

So, according to this embodiment, one or more of the outer secondary outlets 6, 16 may be connected to the gas-liquid reservoir 11 from which a fluid flow is guided to the outlet 13 to form the central flow. This is an efficient way of generating the central flow.

The fluid provided by the secondary outlet conduits 6, 16 may comprise gaseous components that were supposed to leave the fluid separator via the primary outlet conduit 7. Also, the liquid L that is provided by the secondary outlet conduits 6, 16 may comprise components that are accidentally captured by the formed liquid. These components will typically be light components (methane, ethane, propane), which evaporate easily from the liquid L in the gas-liquid reservoir 11. These fractions of evaporated components are guided from the gas-liquid reservoir into inlet 12 and subsequently introduced in the fluid separator via outlet 13, of which the condensable fraction will again be condensed in the throat portion 4 and can be separated in second instance.

According to FIG. 8a, the fluid flow may be taken from the gas-liquid reservoir 11, but it will be understood that the fluid flow may also be taken from another source or may be taken directly from one or more of the secondary outlet conduits 6, 16, i.e. without gas-liquid reservoir 11.

According to a further embodiment, the outer secondary outlet conduit 6 and the further outer secondary outlet conduit 16, are both at least partially fed back to provide the outlet 13 with the central flow. In fact, when even more outer secondary outlet conduits are provided (three, four or more), any of those outer secondary outlet conduits may be used, possibly in combination, to provide the outlet 13 with the central flow.

So there is provided an embodiment of a cyclonic fluid separator according to any one of the preceding claims, further comprising a central body 10 provided upstream of the throat portion 4 in the fluid inlet section, the central body 10 being arranged substantially coaxial to a central axis I of the fluid separator, to form an annular flow path 3 between the central body 10 and a separator housing 20, the cyclonic fluid separator being arranged to facilitate a cyclonic main flow through the converging fluid inlet section and the throat portion towards the diverging fluid outlet section, wherein the central body 10 comprises an outlet 13, directed towards the tubular throat portion 4 and arranged to add a central flow towards the throat portion 4, wherein at least part of the at least one of the outer secondary outlet conduits 6, 16 is connected to outlet 13 to, in use, provide the central flow. In use, the central flow may substantially coincide with the central axis I and may be surrounded by the main flow.

Further provided is a method as described, wherein there is provided a central body 10 upstream of the throat portion 4 in the fluid inlet section, the central body 10 being arranged substantially coaxial to a central axis I of the fluid separator, to form an annular flow path 3 between the central body 10 and a separator housing 20, the method comprises:

using the cyclonic fluid separator to facilitate a cyclonic main flow through the converging fluid inlet section and the throat portion towards the diverging fluid outlet section, wherein the central body 10 comprises an outlet 13, directed towards the tubular throat portion 4 and arranged to add a central flow towards the throat portion 4, wherein at least part of the at least one of the outer secondary outlet conduits 6, 16 is connected to outlet 13 to, in use, provide the central flow. In use, the central flow may substantially coincide with the central axis I and may be surrounded by the main flow.

The outer secondary outlet conduits 6, 16, 17 used to provide the central flow may be positioned at any appropriate position, such as in the converging fluid section, the throat portion 4 and the diverging fluid separation chamber 5. The outer secondary outlet conduit 6 may also be equipped with a further outer secondary outlet conduit 36 positioned in the outer secondary outlet conduit 6, as will be described in more detail below with reference to FIG. 12.

FIG. 8b schematically depicts a variant to the embodiment described with reference to FIG. 8a. According to the embodiment, a multi-stage cyclonic fluid separator is connected to a fractionation column COL-1 as described above with reference to FIG. 5. As can be seen in FIG. 8b, according to this embodiment, a top feed of the fractionation column COL-1 is at least partially used as input for outlet 13 to provide the central flow.

The position of the outlet 13 may be in a region, where in use, velocities in the range of 0.3-1 Mach are obtained. The position of the outlet 13 may be downstream of the swirl imparting vanes 2 and upstream of the throat portion 4, but certainly downstream of R mean, max.

The Mach number is related to the cross sectional area (A) of the flow duct. The sonic velocity (M=1) is realized in the vicinity of the smallest cross sectional area, in the throat portion 4. The smallest cross sectional area is denoted as $A_{throat}$. In use, the maximum Mach number will be above 1, i.e. supersonic, downstream said throat.

The largest cross sectional area, which may coincide with the position of the swirl imparting vanes 2, is denoted as $A_{max}$. The cross sectional area at the position of the outlet 13 is denoted as $A_{13}$.

The outlet 13 may be positioned in a region where the following relation applies:

$$\frac{A_{max}}{A_{13}} \geq 2 \text{ and } \frac{A_{throat}}{A_{13}} < 1$$

This corresponds to the region where, in use, the velocity is above 0.3 Mach. The region may correspond to the region where, in use, the velocity is above 0.3 Mach and below 1 Mach.

Embodiment 5

The present embodiment describes a process scheme for NGL recovery according to an embodiment. The process scheme comprises a multi-stage cyclonic fluid separator as described above.

FIG. 9 schematically depicts a process scheme based on a multi-stage cyclonic fluid separator. The multi-stage cyclonic fluid separator may be without elongated tail end 8, as described above with reference to FIGS. 6-8b.

The process scheme may be fed with an inlet feed S-1, being a compressible fluid flow (such as a feed comprising natural gas), for instance having an inlet pressure ≥60 bar and an inlet temperature≈40° C. The inlet feed S-1 is pre-cooled to form a pre-cooled feed S-3.

The pre-cooling may be done against several (intermediate) product streams using a first cooling unit E-1 to generate a first pre-cooled feed S-2. The first pre-cooled feed S-2 may be cooled further by means of a chilling device C-1 using for instance propane as a cooling fluid, to generate the second pre-cooled feed S-3.

In order to obtain a high thermodynamic efficiency of such a chilling device C-1, the temperature of the second pre-cooled feed S-3 may be set to approximately −30° C. The chilling device C-1 may for instance use propane as a cooling fluid. Such a cooling cycle may become inefficient or ineffective when used to cool to temperatures below −30° C.

In order to overcome this limitation of the chilling device C-1, a second cooling unit E-2 is provided. The second pre-cooled feed S-3 may be cooled even further by the second cooling unit E-2 to form a third pre-cooled feed S-4. In the second cooling unit E-2 the cooling is done against the top product of a fractionation column COL-1 (also known as "distillation towers" or "distillation columns") provided further downstream in the process scheme. An example of such a fractionation column COL-1 is provided above. This top feed of the fractionation column S-22 is guided through the second cooling unit E-2 before proceeding to the exit of the process scheme as depicted in FIG. 9.

The top feed of the fractionation column S-22 is used subsequently for cooling purposes in the second cooling unit E-2 and the first cooling unit E-1. After the first cooling unit E-1 the top feed of the fractionation column (S-22, S-27) is guided via a compressor and an air cooler, after which it is combined with feed S-26 to exit the system as feed S-30.

Before the third pre-cooled feed S-4 enters the cyclonic fluid separator, the gas and liquid containing third pre-cooled feed S-4 may be separated in a vessel V-1. A gaseous top feed S-5 of the vessel V-1 enters the cyclonic fluid separator. A liquid bottom feed S-12 may be directed to a third cooling unit E-3 via a first valve VLV-1, as will be described in more detail below.

FIG. 9 shows a cyclonic fluid separator having two outer secondary output conduits 6, 16: a cyclonic fluid separator comprising a throat portion 4 which is arranged between a converging fluid inlet section and a diverging fluid outlet section, the cyclonic fluid separator being arranged to facilitate a cyclonic flow through the converging fluid inlet section and the throat portion towards the diverging fluid outlet section in a downstream direction, the diverging fluid outlet section comprising an inner primary outlet conduit 7 for condensables depleted fluid components and an outer secondary outlet conduit 6 for condensables enriched fluid components, wherein the cyclonic fluid separator comprises a further outer secondary outlet conduit 16, the outer secondary outlet conduit 6 positioned on a first position along a central axis I of the cyclonic fluid separator and the further outer secondary outlet conduit 16 positioned on a second position along the central axis I of the cyclonic fluid separator.

However, it will be understood that also a single stage cyclonic fluid separator may be used having just one outer secondary output conduit 6, or a multi stage cyclonic fluid separator may be used having more than two outer secondary output conduits, for instance three, four or more.

The (first) outer secondary output conduit 6 generates a first output feed S-7 and the second outer secondary output conduit 16 generates a second output feed S-8. The inner primary outlet conduit 7 generates a condensables depleted feed S-6.

As can be seen in FIG. 9, the condensables depleted feed S-6 may be used in the first cooling unit E-1 to generate the first pre-cooled feed S-2. This condensables depleted feed S-6 may meet the product specification in terms of hydrocarbon dew point and heating value. Before leaving the cold section of the scheme, S-6 passes heat exchanger E-1 to contribute to the feed cooling. If the feed pressure minus the separator pressure drop (typically 40% of the inlet pressure) is above or equal to the required export pressure, no additional compressor is needed to join feed S-26 with the (recompressed and cooled) top feed of the fractionation column S-22, S-27, S-28, S-29.

Due to the small size fractionation column COL-1 (treating only around 50% of the gas flow) and compression bypass of the condensables depleted stream S-6, savings on operational and capital costs can be achieved.

The first output feed S-7 and the second output feed S-8 are further processed in the fractionation column COL-1, which works typically at a pressure of approximately 22 bar. The pressures of the feeds S-7 and S-8 exiting the cyclonic fluid separator are considerably higher and therefore should be let down to the pressure of the fractionation column COL-1.

Before entering the fractionation column COL-1, the higher pressure of S-7 is equalized to the lower pressure of S-8, by means of valve VLV-2 and second vessel V-2.

Next the first and second output feeds S-7, S-8 are fed to a second vessel V-2 to create a vapour column feed S-10 as well as a liquid column feed S-15. The second vessel V-2 is just an example. According to alternatives, the second vessel V-2 may be omitted or may be replaced with two vessels, one for feed S-8 and one for feed S7, S-9.

The vapour column feed S-10 is "directly" connected to the fractionation column COL-1 via a third valve VLV-3 (creating column feed S-11).

The very cold liquid column feed S-15 is directed via a fourth valve VLV-4 after which it continues as cooled feed S-16 to the third cooling unit E-3. Feed S-16 may have a temperature <−80° C. The third cooling unit E-3 may use feed S-16 for cooling a side draw S-18 of the fractionation column COL-1. After having passed the third cooling unit E-3, feed S-16 may continue as feed S-17 and may be inserted into the fractionation column COL-1.

The third cooling unit E-3 may further use the bottom feed S-12 of the first vessel V-1 to cool the side draw S-18 (via first valve VLV-1 creating feed S-13). The bottom feed S-12, S-13 is larger than feed S-16, but is less cold. After having passed the cooling unit E-3, this feed may continue as feed S-14 which may be used in the first cooling unit E-1 and may continue as feed S-25 to enter the fractionation column COL-1.

The side draw S-18 may typically be taken of one of the trays number three-seven (counted from the top of the fractionation column COL-1). The side draw S-18 is then fed to the third cooling unit E-3 in which it is cooled against products indirectly taken from the cyclonic fluid separator, such as the very cold liquid column feed S-15 that is guided to the third cooling unit E-3 via fourth valve VLV-4 after which it continues as cooled feed S-19. The cooled feed S-19 is re-introduced to the fractionation column COL-1.

The re-introduction of the cooled side draw S-19 may be done as shown in FIG. 9. The cooled side draw S-19 may be fed to a third vessel V-3, of which the top feed S-20 is re-fed to the fractionation column COL-1 at a level above the level from which the side draw S-18 is taken. Also, the bottom feed S-21 is also re-fed to the fractionation column COL-1 at a level above the level from which the side draw S-18 is taken. This way, a re-flux is generated.

At the bottom of the fractionation column COL-1a reboiler RB may be provided. At the bottom a bottom feed S-23 is created, which may exit the process scheme as depicted in FIG. 9 via a pump P-1 creating feed S-24. Part of feed S-24 may be fed back into the fractionation column COL-1.

It will be understood that the fractionation column COL-1 is just an example of a separation column that may be used. Other suitable separation columns may be used as well, such as a packed column, in-line columns, in-line contactor (Rapter), supersonic liquid degasser (SCOD).

Due to the bypass stream (i.e. S-6), the column feed S-11 contains considerably less methane than more conventional schemes, for instance using a turbo expander instead of a cyclonic fluid separator. Hence, the scheme around the fractionation column COL-1 is adapted to this different column feed S-11. Optimum fractionation column performance can be achieved by deep cooling a column side draw S-18 using third cooling device E-3 and feeding the cold liquids extracted in third vessel V-3 (feed S-21), containing a high concentration (>40 mole %) of ethane, to the top of the fractionation column COL-1. This cold ethane rich liquid (S-21) effectively absorbs propane in the last separation step.

Also, the top feed from the fractionation column S-22 respectively passes second and first cooling devices E-2 and E-1 to cool the inlet feed S-1 and is recombined with the condensables depleted feed S-6, S-26 after recompression and (optional) cooling (S-27, S-28, S-29) to form feed S-30.

This embodiment has several advantages.

Due to the pre-separation in the cyclonic fluid separator, the column feed S-11 is smaller as well as pre-concentrated. The column feed S-11 is smaller because of the super heated vapour stream (S-6) bypassing the separation column COL-1. Moreover, the column feed S-11 entering the separation column contains more NGL per unit of total flow due to pre-concentration in the cyclonic fluid separator (feeds S-7, S-8). This results in significant savings on the separation column due to the reduced size and significant savings on operational costs due to reduced reboiler heating duty (up to >40%) in the bottom of the column COL-1. In addition the re-compression duty is lower due to a smaller stream.

Using a cyclonic fluid separator provides further advantages with respect to for instance the use of a turbo expander. The cyclonic fluid separator start-up is virtually instant and as there are no moving parts, maintenance can be reduced to a minimum. Furthermore, the removal of NGL liquids halfway the expansion, changes the phase envelope (see FIGS. 2a and 2b), thereby allowing deeper expansion and/or more effective expansion as the volumetric liquid load is limited, producing more liquids. Also the cyclonic fluid separator can be efficiently arranged in a multiple, parallel configuration, allowing for flow turn down without diminishing the thermodynamic efficiency of the expansion process. Finally, further savings are likely to be achieved in capital costs due to more compact design.

FIG. 10 shows a similar embodiment depicted more schematically. FIG. 10 schematically depicts a cooling system CS, a cyclonic fluid separator and a separation column COL. The inlet feed S-1 first enters the cooling system CS, in which it is pre-cooled. Next, the pre-cooled feed S-4 is fed to the cyclonic fluid separator.

The cooling system may comprise several cooling parts, such as a first cooling unit E-1, a chilling device C-1 and a second cooling device E-2, as shown in FIG. 9.

As noted above with reference to FIG. 9, in between the cooling system CS and the cyclonic fluid separator further devices may be present, such as first vessel V-1.

The cyclonic fluid separator produces a first output feed S-7 and a second output feed S-8, which are guided into the separation column COL. The first and second output feeds S-7 and S-8 may be directly coupled to the separation column COL, but may also be indirectly coupled to the separation column COL, for instance via a vessel.

The cyclonic fluid separator may be a multi-stage cyclonic fluid separator, but may also be a single stage cyclonic fluid separator, comprising only a first output feed S-7, instead of a first and second output feed S-7, S-8.

The separation column COL may for instance be a fractionation column COL-1, a packed column, in-line columns, in-line contactor (Rapter). Also, the system may be arranged in such a way to generate bottom reflux and top reflux.

As noted above with reference to FIG. 9, in between the cyclonic fluid separator and the separation column COL further devices may be present, such one or more second vessels V-2. The cyclonic fluid separator may also be directly connected to the separation column COL.

To achieve efficient cooling in the cooling system CS, the relatively cold top feed of the fractionation column S-22 is used in the cooling system CS to cool the inlet feed S-1.

It will be understood that the process scheme depicted in FIG. 10 is a simplified representation of the more detailed process scheme depicted in FIG. 9.

It will be understood that this embodiment may also be put to practice using a single stage cyclonic fluid separator. According to such an embodiment there is provided a system for separating liquids from an inlet feed S-1 being a compressible fluid flow, the system comprising a cooling system CS, a cyclonic fluid separator and a separation column COL, wherein the cooling system CS is arranged to receive the inlet feed S-1 and output a pre-cooled feed S-4 towards the cyclonic fluid separator, the cyclonic fluid separator is arranged to receive the pre-cooled feed S-4 and produce a condensables enriched output feed towards the separation column, the separation column COL is arranged to produce a top feed of the separation column S-22, wherein the system is arranged to guide at least part of the top feed of the separation column S-22 to the cooling system CS to cool the inlet feed S-1.

Accordingly a method may be provided for separating liquids from an inlet feed S-1 being a compressible fluid flow, the system comprising a cooling system CS, a cyclonic fluid separator and a separation column COL, wherein the cooling system CS is arranged to receive the inlet feed S-1 and output a pre-cooled feed S-4 towards the cyclonic fluid separator, the cyclonic fluid separator is arranged to receive the pre-cooled feed S-4 and produce a condensables enriched output feed towards the separation column, the separation column COL is arranged to produce a top feed of the separation column S-22, wherein the system is arranged to guide at least part of the top feed of the separation column S-22 to the cooling system CS to cool the inlet feed S-1.

According to a further embodiment, a side draw S-18 is taken from the separation column COL and is cooled in a cooling unit E-3 against products taken from the cyclonic fluid separator, producing cooled feed S-19, which is reintroduced in the separation column COL. This embodiment may be performed by a system for separating liquids as described above, wherein the separation column COL comprises a side outlet and a further cooling unit E-3, wherein the side outlet is connected to the further cooling unit E-3 to provide a side draw S-18 to the cooling unit E-3, the further cooling unit E-3 is arranged to produce a cooled feed S-19, wherein the further cooling unit E-3 is arranged to receive at least one side cooling draw S-12, S-13; S-15, S-16 taken from in between the cooling system CS and the separation column COL, wherein the further cooling unit E-3 is arranged to use this at least one side cooling draw S-12, S-13; S-15, S-16 to cool the side draw S-18 taken from the separation column COL, and wherein the cooled feed S-19 is reintroduced in the separation column COL.

Also, a corresponding method may be provided, i.e. a method for separating liquids as described above, wherein the separation column COL comprises a side outlet and a further cooling unit E-3, wherein the method comprises:

taking a side draw S-18 from the separation column COL via the side outlet, providing the side draw S-18 to the further cooling unit E-3 to produce a cooled feed S-19, taking at least one side cooling draw S-12, S-13; S-15, S-16 from in between the cooling system CS and the separation column COL, providing the at least one side cooling draw S-12, S-13, S-15, S-16 to the cooling unit E-3 to cool the side draw S-18 taken from the separation column COL, and reintroducing the cooled feed S-19 in the separation column COL.

Instead of the cyclonic fluid separator, any suitable separator may be used.

The side draw S-18 may be taken from the number three to seven tray of the separation column (numbered from the top of the separation column COL).

It will be understood that in case a single stage cyclonic fluid separator is used having just one outer secondary output conduit 6, only first output feed S-7 will be present, which may be fed to the second vessel V-2 to create a vapour column feed S-10 as well as a liquid column feed S-15.

Embodiment 6

A further embodiment will be described with reference to FIG. 11.

According to this embodiment, a cyclonic fluid separator is provided, wherein the first position of the outer secondary outlet is in the diverging fluid outlet section and the second position is in the converging fluid inlet section. The maximum cross sectional flow area of the cyclonic fluid separator is $A_{max}$ and the cross sectional flow area of the cyclonic fluid separator at the position of the further outer secondary outlet conduit 26 is $A_{26}$ and may be such that at the second position:

$$\frac{A_{max}}{A_{26}} \geq 2 \text{ and } \frac{A_{throat}}{A_{26}} < 1.$$

It will be understood that condensation already takes place before the so-called throat portion 4, i.e. in the diverging section. In the section before the throat portion 4, the velocity of the flow increases to reach a sonic velocity in the vicinity of the smallest cross section of the throat portion 4 and a supersonic velocity after passing the smallest cross section of the throat portion 4. Above typically 0.3 Mach, the flow is a compressible flow where the density $\rho=\rho(v)$, v representing the velocity. As a result, condensation occurs in this region.

Therefore, a further outer secondary outlet conduit 26 is provided before the throat portion 4, in other words, upstream with respect to the throat portion and/or the diverging fluid separation chamber 5.

The position of the further outer secondary outlet conduit 26 may be in a region, where in use, velocities in the range of 0.3-1 Mach are obtained. The position of the further outer secondary outlet conduit 26 is downstream of the swirl imparting vanes 2 and upstream of the throat portion 4.

The Mach number is related to the cross sectional area (A) of the flow duct. The sonic velocity (M=1) is realized in the vicinity of the smallest cross sectional area, in the throat portion 4. The smallest cross sectional area is denoted as $A_{throat}$. In use, the maximum Mach number will be substantially equal to M=1 and downstream the throat with further expansion above 1 (M>1) i.e. supersonic.

The largest cross sectional area is denoted as $A_{max}$. The cross sectional area at the position of the further outer secondary outlet conduit 26 is denoted as $A_{26}$.

In order to position the further secondary outlet conduit 26 correctly, it may be positioned in a region where the following relation applies:

$$\frac{A_{max}}{A_{26}} \geq 2 \text{ and } \frac{A_{throat}}{A_{26}} < 1$$

This corresponds to the region where, in use, the velocity is typically above 0.3 Mach.

According to a further embodiment, the position of the further outer secondary outlet conduit 26 may be in a region where, in use, velocities in the range of 0.5-1 Mach are obtained. In order to position the further secondary outlet conduit 26 according to this embodiment, it may be positioned in a region where the following relation applies:

$$\frac{A_{max}}{A_{26}} \geq 3 \text{ and } \frac{A_{throat}}{A_{26}} < 1.$$

It is emphasized that embodiment 2 above relates to the removal of liquids and solids already present in the flow entering the cyclonic fluid separator, while the present embodiment relates to removal of condensed liquid particles. These different purposes result in different positions of the further outer secondary outlet conduits 17 and 26 respectively.

Embodiment 7

A further embodiment will be described with reference to FIG. 12.

According to this embodiment, a cyclonic fluid separator is provided, wherein the first position and the second position are in the diverging fluid outlet section. The further outer secondary outlet conduit 36 may be positioned in the outer secondary outlet conduit 6.

FIG. 12 schematically shows a cyclonic fluid separator as described above with reference to FIG. 1, now comprising a further outer secondary outlet conduit 36 positioned in the outer secondary outlet conduit 6.

As mentioned above, the diverging fluid separation chamber 5 is arranged to skim off the condensables enriched fluid components from condensables depleted fluid components. However, not only condensables enriched fluid components are skimmed of, but the flow in the outer secondary outlet conduit 6 may comprise gas.

This embodiment makes use of surplus pressure drop available in the secondary outlet 6. This pressure drop may be used to further expand the liquid enriched fluid in this annular duct (6) such that ongoing condensation occurs. The entry of outer secondary outlet conduit 6 functions as a second throat 37. The pressure at the inlet of the outer secondary outlet conduit 6 is referred to as $P_6$. The throat may have a gap width $D_{37}$, where $D_{37}$ is defined substantially perpendicular to the flow direction.

The pressure at the inlet of the cyclonic fluid separator is referred to as $P_{in}$.

After the second throat 37, the flow is allowed to expand further to supersonic velocity such that the rate of expansion is higher if the outlet pressure ($P_{out}$) from the outer secondary outlet conduit 6 becomes lower. In other words, the higher the pressure drop ($P_{drop}=P_{in}-P_{out}$) over the cyclonic fluid separator, the more expansion is created.

The outlet pressure $P_{out}$ may be determined by the fractionation column downstream of the outer secondary outlet conduit 6 (not shown in FIG. 12). Typically the outlet pressure $P_{out}$ is in the range 10-35 bar and the inlet pressure $P_{in}$ is typically in the range 40-100 bar. Hence, the total available pressure drop available over the outer secondary outlet conduit 6 may be >50% of the inlet pressure $P_{in}$.

Since the required pressure drop for deep NGL recovery is typically 40-45% there may be excess pressure drop available (e.g. 5% or more) in the outer secondary outlet duct 6 to create further expansion. This excess pressure drop may therefore be used in the outer secondary outlet conduit 6 to create further expansion and further condensation.

Since the flow inside the outer secondary outlet conduit 6 is still swirling, the new condensed droplets are forced into the further outer secondary outlet conduit 36, together with the condensed droplets already present at the entrance of the outer secondary outlet conduit 6, i.e. at the entrance of second throat 37. In order to preserve the swirling motion the mean diameter of the outer secondary outlet conduit 6 in between the second throat 37 and the further outer secondary outlet conduit 36 may be kept as small as possible, or at least may be kept constant.

The further outer secondary outlet conduit 36 may be positioned at a second position downstream with respect to the first position of the outer secondary outlet conduit 6, such that the first and second position are at a distance X, whereby $X \geq 5*D_{37}$ or $X > 10*D_{37}$. If the excess pressure drop in the outer secondary outlet duct 6 is larger than 5% one can extend the distance D to more than 10 times $D_{37}$ in order to yield a higher liquid flow via duct 36.

The second position may be chosen such that it coincides with the position where expansion is maximal within the outer secondary outlet conduit 6.

By operating this second split device at the lowest possible temperature, one can concentrate the liquids further in a flow duct 36 thereby avoiding excessive re-evaporation of low boiling liquids.

FURTHER REMARKS

The descriptions above are intended to be illustrative, not limiting. Thus, it will be apparent to one skilled in the art that modifications may be made to the invention as described without departing from the scope of the claims set out below.

The invention claimed is:

1. A system for separating liquids from an inlet feed (S-1) being a compressible fluid flow, the system comprising:
   a cooling system (CS-1);
   a cyclonic fluid separator, the cyclonic fluid separator including a throat portion (4) which is arranged between a converging fluid inlet section and a diverging fluid outlet section, the cyclonic fluid separator being arranged to facilitate a cyclonic flow through the converging fluid inlet section and the throat portion towards the diverging fluid outlet section in a downstream direction;
   wherein the diverging fluid outlet section includes an inner primary outlet conduit (7) for condensables depleted fluid components and an outer secondary outlet conduit (6) for condensables enriched fluid components;
   wherein the diverging fluid outlet section further includes a further outer secondary outlet conduit (16);
   wherein the outer secondary outlet conduit (6) is positioned on a first position along a central axis (I) of the cyclonic fluid separator and the further outer secondary outlet conduit (16) is positioned on a second position along the central axis (I) of the cyclonic fluid separator; and
   a separation column (COL);
   wherein the cooling system (CS) is arranged to receive the inlet feed (S-1) and output a pre-cooled feed (S-4) towards the cyclonic fluid separator;
   wherein the cyclonic fluid separator is arranged to receive the pre-cooled feed (S-4) and produce a condensables enriched first output feed (S-7) and a condensables enriched second output feed (S-8) towards the separation column;
   wherein the separation column (COL) is arranged to produce a top feed of the separation column (S-22); and
   wherein the system is arranged to guide at least part of the top feed of the separation column (S-22) to the cooling system (CS) to cool the inlet feed (S-1).

2. The system according to claim 1,
   wherein the separation column (COL) comprises a side outlet and a further cooling unit (E-3), wherein the side outlet is connected to the further cooling unit (E-3) to provide a side draw (S-18) to the cooling unit (E-3), the further cooling unit (E-3) is arranged to produce a cooled feed (S-19);
   wherein the further cooling unit (E-3) is arranged to receive at least one side cooling draw (S-12, S-13; S-15, S-16) taken from in between the cooling system (CS) and the separation column (COL), wherein the further cooling unit (E-3) is arranged to use this at least one side cooling draw (S-12, S-13, S-15, S-16) to cool the side draw (S-18) taken from the separation column (COL); and
   wherein the cooled feed (S-19) is reintroduced in the separation column (COL).

3. A system for separating liquids from an inlet feed (S-1) being a compressible fluid flow, the system comprising:
   a cooling system (CS);
   a cyclonic fluid separator including a throat portion (4) which is arranged between a converging fluid inlet section and a diverging fluid outlet section, the cyclonic fluid separator being arranged to facilitate a cyclonic flow through the converging fluid inlet section and the throat portion towards the diverging fluid outlet section in a downstream direction;
   wherein the diverging fluid outlet section includes an inner primary outlet conduit (7) for condensables depleted fluid components and an outer secondary outlet conduit (6) for condensables enriched fluid components;
   wherein the diverging fluid outlet section further includes a further outer secondary outlet conduit (16), the outer secondary outlet conduit (6) positioned on a first position along a central axis (I) of the cyclonic fluid separator and the further outer secondary outlet conduit (16) positioned on a second position along the central axis (I) of the cyclonic fluid separator; and
   a separation column (COL);
   wherein the cooling system (CS) is arranged to receive the inlet feed (S-1) and output a pre-cooled feed (S-4) towards the cyclonic fluid separator;
   wherein the cyclonic fluid separator is arranged to receive the pre-cooled feed (S-4) and produce a condensables enriched first output feed (S-7) and a condensables enriched second output feed (S-8) towards the separation column;
   wherein the separation column (COL) is arranged to produce a top feed of the separation column (S-22); and
   wherein the system is arranged to guide at least part of the top feed of the separation column (S-22) to the cooling system (CS) to cool the inlet feed (S-1).

4. The system according to claim 3,
   wherein the separation column (COL) comprises a side outlet and a further cooling unit (E-3);
   wherein a side draw (S-18) is obtainable from the separation column (COL) via the side outlet and the side draw (S-18) is provideable to the further cooling unit (E-3) to produce a cooled feed (S-19);
   wherein at least one side cooling draw (S-12, S-13; S-15, S-16) is obtainable from in between the cooling system (CS) and the separation column (COL) and the at least one side cooling draw (S-12, S-13, S-15, S-16) is provideable to the cooling unit (E-3) to cool the side draw (S-18) taken from the separation column (COL); and wherein the cooled feed (S-19) is reintroduceable in the separation column (COL).

\* \* \* \* \*